(12) United States Patent
Hansen

(10) Patent No.: US 12,536,591 B2
(45) Date of Patent: Jan. 27, 2026

(54) STOCK FILTER FOR TARGETING A SMALL LIST OF LIKELY FAVORABLE STOCKS

(71) Applicant: Hans P. Hansen, Garwood, NJ (US)

(72) Inventor: Hans P. Hansen, Garwood, NJ (US)

(73) Assignee: Hans P. Hansen, Garwood, NJ (US)

( * ) Notice: Subject to any disclaimer, the term of this patent is extended or adjusted under 35 U.S.C. 154(b) by 0 days.

(21) Appl. No.: 19/196,764

(22) Filed: May 2, 2025

(65) Prior Publication Data

US 2025/0342527 A1    Nov. 6, 2025

Related U.S. Application Data

(60) Provisional application No. 63/641,422, filed on May 2, 2024.

(51) Int. Cl.
*G06Q 40/04*    (2012.01)

(52) U.S. Cl.
CPC .................. *G06Q 40/04* (2013.01)

(58) Field of Classification Search
CPC ...................................... G06Q 40/04
See application file for complete search history.

(56) References Cited

U.S. PATENT DOCUMENTS

| 5,761,442 | A | 6/1998 | Barr et al. |
| 8,386,373 | B2 | 2/2013 | Fitzpatrick et al. |
| 8,412,611 | B2* | 4/2013 | Ricketts ............. G06Q 40/06 705/36 R |
| 8,635,130 | B1* | 1/2014 | Smith ................ G06Q 40/04 705/35 |

(Continued)

FOREIGN PATENT DOCUMENTS

| CN | 116128323 A | 5/2023 | |
| GB | 2590598 A * | 7/2021 | ............. G06Q 40/06 |

(Continued)

OTHER PUBLICATIONS

Bermejo et al.: Factor Investing: A Stock Selection Methodology for the European Equity Market, 2021, Heliyon, 7, e08168, pp. 1-14 (Year: 2021).*

(Continued)

*Primary Examiner* — Bijendra K Shrestha
(74) *Attorney, Agent, or Firm* — Gearhart Law LLC

(57) ABSTRACT

A method for stock monitoring and trading, where an unfiltered set of potential stocks of interest each having a unique stock identifier is established. The unfiltered set contains greater than one hundred unique stocks. The unfiltered set is filtered via a primary filter to create a post-primary-filtered stock set having a primary quantity. The primary filter substantially ensures that the post-primary-filtered stock set contains unique stocks with an average (close-low) percentage change greater than three (3) percent (%). The primary quantity is at most five (5). The post-primary-filtered stock set simultaneously displays unique (Continued)

stocks contained therein for a given day. That is, the displaying simultaneously displays and recurringly updates for each unique stock in the post-primary-filtered stock set at least percentage change from low and a percentage change from high for each of the unique stocks in the first filtered set.

19 Claims, 27 Drawing Sheets

(56) References Cited

U.S. PATENT DOCUMENTS

| | | | |
|---|---|---|---|
| 9,213,988 B2 | 12/2015 | Lamoureux et al. | |
| 9,607,303 B2 | 3/2017 | Bonaguro et al. | |
| 11,257,161 B2 | 2/2022 | Sisk | |
| 2003/0069834 A1* | 4/2003 | Cutler | G06Q 40/03 |
| | | | 705/37 |
| 2003/0135445 A1 | 7/2003 | Herz et al. | |
| 2010/0013198 A1 | 1/2010 | Karlsson | |
| 2010/0257117 A1 | 10/2010 | Shvadron et al. | |
| 2011/0131076 A1 | 6/2011 | Leidner et al. | |
| 2011/0320383 A1* | 12/2011 | Chang | G06Q 40/06 |
| | | | 705/36 R |
| 2012/0059771 A1 | 3/2012 | von Groll et al. | |
| 2016/0335307 A1* | 11/2016 | Teodorescu | G06F 16/221 |
| 2021/0065303 A1* | 3/2021 | Aliaga-Diaz | G06Q 40/04 |
| 2021/0182972 A1 | 6/2021 | Yeh et al. | |
| 2024/0127337 A1* | 4/2024 | Zheltikov | G06Q 40/06 |

FOREIGN PATENT DOCUMENTS

| | | | | |
|---|---|---|---|---|
| KR | 20220039237 A | * | 3/2022 | G06Q 40/06 |
| WO | WO-0072206 A2 | * | 11/2000 | G06Q 40/06 |
| WO | WO-03010629 A2 | * | 2/2003 | G06Q 40/04 |
| WO | WO-2007085055 A1 | * | 8/2007 | G06Q 40/04 |

OTHER PUBLICATIONS

Guo et al.: RankFirst, Visual Analysis for Factor Investment Ranking Stock Timeseries, 2022, IEEE, pp. 1-11 (Year: 2022).*

Wang et al.: HATR-1: Hierarchical Adaptive Temporal Relational Interaction for StockTrend Prediction, 2023 IEEE Transactions on Knowl, pp. 1-15 (Year: 2023).*

Deveikyte, et al., "A Sentiment Analysis Approach to the Prediction of Market Volatility", Dec. 10, 2020, 11 pages, Cornell University (arXiv), US, URL—https://arxiv.org/pdf/2012.05906.

Mao, et al., "Predicting Financial Markets: Comparing Survey, News, Twitter and Search Engine Data", Dec. 5, 2011, 10 pages, Cornell University (arXiv), US, https://arxiv.org/abs/1112.1051.

U.S. Appl. No. 63/641,422, Title: Stock Filter for Targetting a Small List of Likely Favorable Stocks, Inventor: Hans P. Hansen, filed May 2, 2024.

* cited by examiner

- Step 1. Select a list of Stocks to filter
- Step 2. Remove symbols with a 50 day moving average trading volume less than 800,000 shares
- Step 3. Execute Performance Filtering (stop filtering when 5 or fewer symbols remain)
  - Step 3a. Select AccPos or AccNeg based on which yields the most symbols
    - If AccPos and AccNeg files yield the same number of symbols then select the AccPos or AccNeg file with the higher FileUnderTest/Backtest.
    - Subsequently, if both AccPos and AccNeg files have the same FileUnderTest/Backtest, then use AccPos.
  - Step 3b. Select RsPos or RsNeg based on which yields the most symbols
    - If RsPos and RsNeg files yield the same number of symbols then select the RsPos or RsNeg file with the higher FileUnderTest/Backtest.
    - Subsequently, if both RsPos and RsNeg files have the same FileUnderTest/Backtest, then use RsPos.
  - Step 3c. Select CompPos or CompNeg based on which yields the most symbols
    - If CompPos and CompNeg files yield the same number of symbols then select the CompPos or CompNeg file with the higher FileUnderTest/Backtest.
    - Subsequently, if both CompPos and CompNeg files have the same FileUnderTest/Backtest, then use CompPos.
- Step 4. Execute Rank Filtering (stop filtering when 5 or fewer symbols remain)
  - Step 4a. Select Ace parameter based on which yields the most symbols
    - When two or more Ace parameters yield the same highest number of symbols, then select the Ace parameter with the higher FileUnderTest/Backtest.
    - Subsequently, if these Ace parameters have the same FileUnderTest/Backtest, then the select the parameter with the higher IBD rating.
  - Step 4b. Select Rs parameter based on which yields the most symbols
    - When two or more Rs parameters yield the same highest number of symbols, then select the Rs parameter with the higher FileUnderTest/Backtest.
    - Subsequently, if these Rs parameters have the same FileUnderTest/Backtest, then the select the parameter with the higher IBD rating.

FIG. 2B

- Step 4c. Select Comp parameter based on which yields the most symbols
  - When two or more Comp parameters yield the same highest number of symbols, then select the Comp parameter with the higher FileUnderTest/Backtest.
  - Subsequently, if these Comp parameters have the same FileUnderTest/Backtest, then the select the parameter with the higher IBD rating.
- Step 4d. Select GrpRsPos orGrpRsNeg based on which yields the most symbols
  - When GrpRsPos and GrpRsNeg yield the same number of symbols, then select GrpRsPos or GrpRsNeg with the higher FileUnderTest/Backtest.
  - Subsequently, if GrpRsPos and GrpRsNeg have the same FileUnderTest/Backtest, then the select GrpRsPos
- Step 4e. Select GrpRs parameter based on which yields the most symbols
  - When two or more GrpRs parameters yield the same highest number of symbols, then select the GrpRs parameter with the higher FileUnderTest/Backtest.
  - Subsequently, if these GrpRs parameters have the same FileUnderTest/Backtest, then the select the parameter with the higher IBD rating.

FIG. 2B (Continued)

| Symbol | B5M | B10M | B15M | B20M | B25k | B30k | B1H | B2H | B3H | B4H | B5H | B6H | Green | Red | SM | D | MM | ILM | DSM>k | MM>k |
|---|---|---|---|---|---|---|---|---|---|---|---|---|---|---|---|---|---|---|---|---|
| VFS | 1.55 | 1.91 | 2.11 | 2.32 | 1.64 | 0.62 | 3.21 | 2.44 | 6.08 | 0.92 | 6.08 | -7.55 | 13 | 15.86 | | | | | | |
| FULC | 0.07 | 0.55 | 0.4 | 0.23 | 0.07 | 0.15 | -1.73 | -4.34 | -2.96 | 3.13 | 1.07 | 6.75 | 10 | -5.09 | | | | | | |
| MARA | -0.42 | -1.03 | -0.65 | 0.3 | 0.51 | 1.12 | 0.43 | -0.89 | 0.17 | 1.82 | 3.76 | 4.64 | 8 | -1.18 | | | | | | |
| DCTH | 0.35 | 0.35 | -0.17 | -0.35 | -1.05 | -0.86 | -1.54 | -1.2 | -1.35 | -1.03 | 3.05 | 4.17 | 7 | -2.22 | | | | | | |
| CVNA | -0.05 | -0.67 | -0.59 | -0.12 | -0.07 | -0.3 | -0.67 | -0.33 | 0.47 | -0.45 | 0.93 | 3.76 | 6 | -1.01 | | | | | | |
| FN | 0.04 | -0.18 | -0.09 | 0.02 | 0.12 | 0.46 | 0.08 | -0.23 | -0.28 | 1.18 | 2.95 | 4.39 | 6 | -0.35 | | | | | | |
| SOS | -0.32 | -0.94 | -1.56 | -0.79 | -0.16 | -0.16 | 0.32 | 2.27 | -1.49 | -2.78 | -1.72 | -2.85 | 4 | -4.83 | | | | | | |
| DLO | 0.08 | -0.21 | -0.18 | -0.21 | -0.34 | 0.02 | -0.37 | -0.16 | -0.55 | 0.03 | -0.39 | 0.69 | 2 | -2.08 | | | | | | |
| NVAX | -0.11 | -0.07 | -0.5 | -0.61 | -0.52 | -0.55 | -0.88 | -1.91 | -1.7 | -2.44 | -4.46 | 1.63 | 2 | -5.17 | | | | | | |
| HRB | -0.23 | -0.16 | -0.5 | 0.04 | 0.16 | 0.2 | 0.1 | -0.21 | -0.1 | 0.25 | 1.1 | 0.84 | 1 | -0.35 | | | | | | |
| VIGN | 0.36 | 0.36 | 0.73 | 0.36 | 0.18 | -0.9 | -1.43 | -1.26 | -2.91 | -6.62 | -7.56 | -3.34 | 1 | 11.86 | | | | | | |
| HKD | -0.01 | 0.33 | -0.65 | -0.02 | -1.13 | -2 | -2.24 | -5.13 | -4.97 | -0.66 | -0.93 | -2.27 | 1 | 10.62 | | | | | | |

Audio
Live TV
Markets
DOW
S&P 500
NASDAQ
Fear & Greed Index

Latest Market News
Nvidia's quarterly sales double on the back of AI boom
Many Maui restaurants were destroyed in the fires. For those that survived, their future rem uncertain
America added 306,000 fewer jobs last year than we thought. But the labor market is still h 'A gigantic pile of ash' https://www.benzinga.com/trading-ideas/long-ideas/23/08/3400374/top-5-tech-stocks-that-are-set-to-fly-this-month
https://www.zacks.com/stock/news/2139545/implied-volatility-surging-for-marathon-digital-mara-stock-options
https://www.investing.com/analysis/elon-musks-bitcoin-sales-rock-crypto-stocks-what-happens-next-200641171
https://www.fool.com/investing/2023/08/18/heres-where-to-invest-1000-right-now/
https://www.zacks.com/commentary/2136352/crypto-3-fresh-catalysts-mean-higher-prices-ahead
https://www.benzinga.com/analyst-ratings/23/08/33662614/what-4-analyst-ratings-have-to-say-about-marathon-digital-holdings
https://www.zacks.com/stock/news/2134068/marathon-digital-holdings-inc-mara-reports-q2-loss-misses-revenue-estimates
https://www.benzinga.com/markets/cryptocurrency/23/08/33646256/bitcoin-miner-marathon-digital-reports-314-increase-in-bitcoin-production-but-misses-estim

Any Lists Containing a Symbol

◁ August 2023 ▷

| Sun | Mon | Tue | Wed | Thu | Fri | Sat |
|-----|-----|-----|-----|-----|-----|-----|
| 30  | 31  | 1   | 2   | 3   | 4   | 5   |
| 6   | 7   | 8   | 9   | 10  | 11  | 12  |
| 13  | 14  | 15  | 16  | 17  | 18  | 19  |
| 20  | 21  | 22  | (23)| 24  | 25  | 26  |
| 27  | 28  | 29  | 30  | 31  | 1   | 2   |
| 3   | 4   | 5   | 6   | 7   | 8   | 9   |

○ Today: 8/23/2023

| Search | | MARA |

Lists Containing Symbol

IBD-AccB_8_22_2023.txt
IBD-AvgVolGt800k_8_22_2023.txt
IBD_AvgVolSymbolsGT_200K_8_22_20
IBD-CompGt40Le80_8_22_2023.txt
IBD-EpsGt40Le80_8_22_2023.txt
IBDGroup_Finance-InvestmentMgmt_8
IBD-GrpRsC_8_22_2023.txt
IBD-PcntPrChgGtNeg5Le0_8_22_2023
IBD-PcntVolChgGeNeg100LeNeg40_8
IBD-PcntVolChgNeg_8_22_2023.txt

Last Trade

| Symbol | MARA |
|--------|------|
| Time | 8/23/2023 4:56:58 PM |
| Bid Price | 11.86 |
| Bid Size | 1 |
| Ask Price | 11.88 |
| Ask Size | 3 |

IBD Statistics

| Parameter | Value |
|-----------|-------|
| Industry | Finance-Investment Mgmt |
| Symbol | MARA |
| Name | Marathon Digital |
| Current Price | 10.95 |
| Price Chg | -0.1 |
| Volume | 19751000 |
| Parameter | -49.7 |
| EPS | 64 |
| RS | 93 |
| IndGroupRS | C |
| SMR | E |
| AccDis | B- |
| Comp | 68 |
| smrNum | 14 |
| accdisNum | 6 |

STOCK FILTER FOR TARGETING A SMALL LIST OF LIKELY FAVORABLE STOCKS

CROSS-REFERENCE TO RELATED APPLICATIONS

The present application claims priority under 35 USC 119(e) to U.S. Provisional Application No. 63/571,490 filed Mar. 29, 2024, the contents of which are hereby incorporated by reference in its entirety.

FIELD

The field of the invention and its embodiments relate to financial stock transactions and more specifically to a stock filter for targeting a small list of likely favorable stocks.

BACKGROUND

As volatility in trading markets have increased over the years, a long term buy and hold strategy has become increasingly risky. That is, the gains achieved by such a strategy has increasingly diminished since 1971. Thus, a buy and hold consumer has increasing experienced diminishing returns compared to reliance on other, more dynamic strategies. These more dynamic strategies, however, are often thought to be overly complex, so much so that they fall into an exclusive realm of trained professionals.

That is, trading challenges, undoubtedly the cornerstone of every trader's journey, present a myriad of obstacles to conquer. These trading challenges encompass a wide range of factors, testing the mettle of even the most seasoned professionals. With the fast-paced and ever-changing nature of the financial markets, professionals to novices experience largely the same challenges, which can be successfully navigated; at least to an extent to extend performance over the increasingly less optimal buy and hold baseline.

Volatility, often believed to be the foremost among the trading challenges, introduces a sense of urgency and opportunity. Market fluctuations demand traders to remain poised and make swift, well-informed decisions to capitalize on potential gains while mitigating risks. The ability to manage risk effectively, another challenge, safeguards traders' capital and fosters long-term profitability. Volatility means that dynamic strategies must be deployed, as the market is constantly adjusting and reoptimizing. In fact, the academic theory of an efficient market presumes the market will always automatically adjust to near optimal conditions, after a relatively short lag period. This leads many traders to believe that information dominance, having superior information on underlying stocks to the "market" is necessary to achieve the best consistent results. The various theories on specific mechanisms for doing so are almost as vast as the stars in the universe and are often highly guarded secrets.

Information overload poses significant trading challenges in the digital era, where an abundance of data floods the financial markets. Traders must develop the skills to sift through this vast sea of information, extracting relevant insights that inform their trading decisions. This skill enables them to stay ahead of the curve and make well-calibrated moves. Some have come to rely on increasingly complex tools, such as artificial intelligence to shift through truly overwhelming realms of data to beat the general principle of market efficiency. The increased use of powerful information shorting and processing tools leaves many to believe that human beings with limited resources are increasing becoming disadvantaged in the stock market.

What is needed is a way to quickly filter a vast set of stocks and related information into a relatively modest set of stocks, which can be simultaneously monitored on a daily basis to a trader's advantage. Ideally, such a filtering of stocks will be dynamic so that it effectively is self-adjusting to target an optimal set of stocks.

SUMMARY OF THE EMBODIMENTS

The present invention and its embodiments relate to a program and method to analyze the performance of prior day trading stocks in order to identify a small list of stocks with a high probability of having a substantially greater closing price than the lowest price experienced during the training session. Basically, stocks sought are those with deep nulls or valleys and high peaks. An initial unfiltered set of stocks can be extracted from a combination of one or more daily lists, such as the daily list provided by INVESTOR's BUSINESS DAILY (IBD) and/or the ASSOCIATION OF CHARTERED CERTIFIED ACCOUNTANTS (ACCA). An initial unfiltered set will typically have more than one hundred unique stocks. The unfiltered set is run through a primary filter, which may have multiple sub-steps and sub-filters. In one embodiment, the primary filter can include a first filter that filters out all unique stocks with a moving average trading volume less than or equal to a first sub-filter threshold of shares, such as 800,000 shares. A second sub-filter is a performance filter and a third filter can be a ranking filter. The primary filter contains a small set, such as five, of unique stocks with a very high likelihood of having an average (close-low) percentage change greater than three (3) percent (%). The resulting set of five stocks, or another configurable number referred to as the primary quantity, are able to be displayed simultaneously and updated throughout a given trading day. In one embodiment, the displaying can recurringly update for each unique stock, its percentage change from low, its percentage change from high, and provide other relevant dynamic data and charts.

One aspect of the disclosure is for a method for targeted stock monitoring and trading. An unfiltered set of potential stocks of interest each having a unique stock identifier are established. The unfiltered set has at least a unique stock identifier. The unfiltered set contains greater than one hundred unique stocks. The unfiltered set is filtered via a primary filter to create a post-primary-filtered stock set having a primary quantity. The primary filter substantially ensures that the post-primary-filtered stock set contains unique stocks with an average (close low) percentage change greater than about three (3) percent (%). The primary quantity is at most five (5). The post-primary-filtered stock set simultaneously displays unique stocks contained therein for a given day. That is, the displaying simultaneously displays and recurringly updates for each unique stock in the post-primary-filtered stock set at least percentage change from low and a percentage change from high for each of the unique stocks in the first filtered set.

Another aspect of the disclosure is for a method for targeted stock monitoring and trading. An unfiltered set of potential stocks of interest each having a unique stock identifier is established. The unfiltered set may include at least a unique stock identifier and stock specific information to determine a fifty-day moving average of shares traded daily. The unfiltered set contains greater than one hundred unique stocks. The unfiltered set is filtered via a primary filter to create a post-primary-filtered stock set having a primary quantity. The primary filter is configured to substantially ensure that the post-primary-filtered stock set contains unique stocks with an average (close low) percentage change greater than about three (3) percent (%), where the primary quantity is at most about five (5).

In embodiments, the primary filter utilizes a first sub-filter, a second sub-filter, and a third sub-filter. The unfiltered subset is filtered via a first sub-filter to generate a post-first-filter subset. The first sub-filter filters out all unique stocks with a moving average trading volume less than or equal to a first sub-filter threshold of shares. The post-first-filter subset is filtered via a second sub-set filter to generate a post-second-filter subset. The second-sub-filter is a performance filter. The post-second-filter subset is filtered via a third sub-set filter to generate a post-third-filter subset. The third-sub-filter performs rank filtering. The post-primary-filtered stock list is the post-third-filter subset. The post-primary-filtered filtered stock set is displayed simultaneously for a given day. The displaying simultaneously displays and recurringly updates for each unique stock in the post-primary-filtered stock set at least percentage change from low and a percentage change from high for each of the unique stocks in the first filtered set.

Another aspect of the disclosure is for a method for targeted stock monitoring and trading. An unfiltered set of potential stocks of interest each having a unique stock identifier is established. The unfiltered set has at least a unique stock identifier and stock specific information to determine a fifty-day moving average of shares traded daily. The unfiltered set contains greater than one hundred unique stocks. The unfiltered set is derived from one or more online daily lists of stocks including at least one of an INVESTOR's BUSINESS DAILY list and an ASSOCIATION OF CHARTERED CERTIFIED ACCOUNTANTS (ACCA) list. The unfiltered set is dynamic in that it changes daily. The unfiltered set is filtered via a primary filter to create a post-primary-filtered stock set having a primary quantity of five or less. The primary filter is configured to substantially ensure that the post-primary-filtered stock set contains unique stocks with an average (close low) percentage change greater than about three (3) percent (%). Online information based on a publicly available end of day data is utilized by the primary filter. The post-primary-filtered filtered stock set is displayed simultaneously for a given day. The displaying simultaneously displays and recurringly updates each unique stock in the post-primary-filtered stock set, at least percentage change from low and a percentage change from high for each of the unique stocks in the set. Online information based on publicly available updates is used for the recurrent updates for each unique stock being simultaneously displayed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2B provides a stepwise diagram for an embodiment of creating small listing of stocks of interest, in accordance with embodiments of the present invention.

FIG. 2C-2K provide a set of flow charts for filtering stocks, in accordance with embodiments of the present invention.

DETAILED DESCRIPTION

Figure 1A:
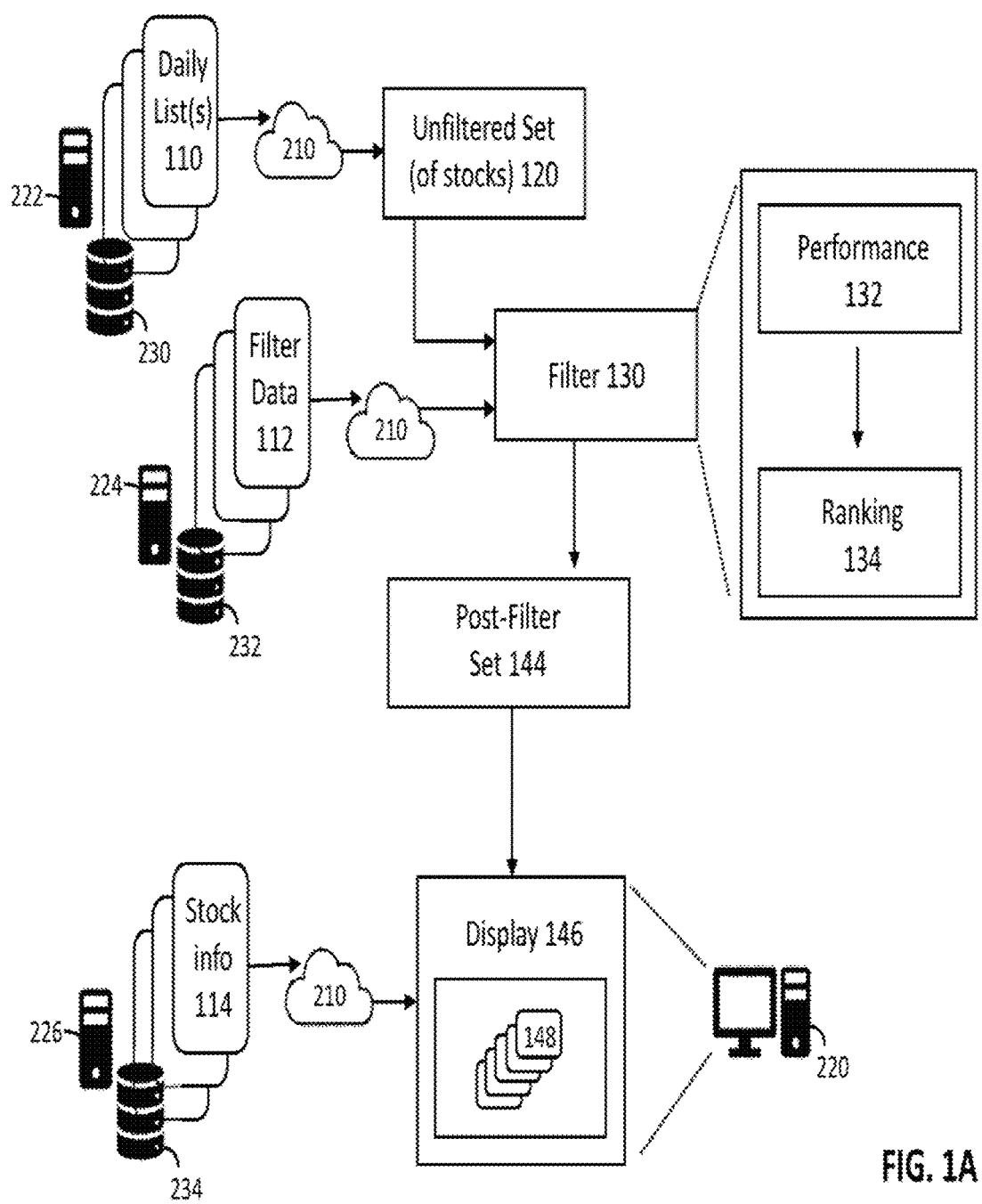
FIG. 1A depicts a block diagram to acquire and filter a set of stocks, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, an "embodiment" means that a particular feature, structure or characteristic is included in at least one or more manifestations, examples, or implementations of this invention. Furthermore, the particular features, structures or characteristics may be combined in any suitable manner, as would be apparent to a person having ordinary skill in the art. Combinations of features of different embodiments are meant to be within the scope of the invention, without the need for explicitly describing every possible permutation by example. Thus, any of the claimed embodiments can be used in any combination.

The phrase "and/or," as used herein in the specification and in the claims, should be understood to mean "either or both" of the elements so conjoined, e.g., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements), etc.

As used herein, the word "include," and its variants, is intended to be non-limiting, such that recitation of items in a list is not to the exclusion of other like items that may also be useful in the compositions and methods of this technology. Similarly, the terms "can" and "may" and their variants are intended to be non-limiting, such that recitation that an embodiment can or may comprise certain elements or features does not exclude other embodiments of the present technology that do not contain those elements or features.

FIGS. 1-7 illustrate example systems and methods for targeted stock monitoring, filtering, and trading decision support. The systems and methods begin by establishing an unfiltered set of one or more stocks of interest, wherein each stock is associated with a unique stock identifier and related stock-specific data, such as daily high, low, close prices, and trading volume. This initial unfiltered set may incorporate additional computed data, such as a fifty-day moving average of shares traded daily, to support preliminary eligibility assessments.

The unfiltered set is then processed through a primary filtering operation, where a primary filter selects stocks that meet specific performance metrics, such as minimum trading volume thresholds and minimum percentage changes from daily lows or highs. This primary filtering stage generates a post-primary-filtered stock set with a limited number of stocks, referred to as a primary quantity, intended to highlight a concise, high-interest list for the user. Following the primary filtering, the systems and methods apply additional layers of refinement using sub-filters. A first sub-filter generates a post-first-filter subset, a second sub-filter further reduces the subset to a post-second-filter subset, and a third sub-filter produces a post-third-filter subset. These sub-filters may incorporate progressively stricter or different criteria, such as recent price performance, ranking metrics, or composite technical indicators, enabling a multi-stage selection process that adapts to varying market conditions and user preferences.

The resulting filtered stock set is then displayed simultaneously to users for a given trading day, allowing for efficient side-by-side comparison and tracking. Furthermore, the systems and methods enable simultaneous and recurring display of key performance updates for each stock in the post-primary-filtered stock set, such as real-time or periodically refreshed percentage changes from daily lows and highs. By automating the filtering, ranking, and updating processes, the systems and methods illustrated in FIGS. 1-4 provide an intelligent and dynamic framework for narrowing a broad universe of stocks into a focused, actionable set that aligns with user-defined or system-optimized trading criteria. This approach enhances decision-making efficiency and supports timely, data-driven trading activities.

The disclosed systems and methods provide specific technical solutions to technical problems associated with real-time stock monitoring and filtering, moving beyond generic computer implementation. Traditional stock tracking tools often overwhelm users with large volumes of unprioritized data, leading to inefficiencies in analysis and decision-making. In contrast, the present disclosure introduces a structured, multi-stage filtering architecture that systematically reduces an unfiltered set of stocks through primary and secondary sub-filters based on non-conventional criteria, such as dynamically computed average close-to-low percentages, volume-based eligibility tied to fifty-day moving averages, and intersectional ranking parameters derived from historical performance metrics. These filtering processes are not merely mathematical concepts or mental processes performed on a general-purpose computer; instead, they are tightly integrated into a specialized stock evaluation framework that operates in real time and dynamically updates based on incoming market data. Moreover, the system simultaneously and recurringly displays one or more performance metrics, such as percentage changes from highs and lows, for a filtered, targeted set of stocks, using data aggregation techniques specifically optimized for stock tracking environments. Collectively, these additional elements provide significant improvements to the functioning of stock monitoring systems themselves, offering concrete technological benefits including reduced computational load, more efficient resource utilization in data display and updating, and improved user interaction by delivering actionable, focused information rather than requiring manual sifting through unfiltered stock lists. Thus, the claimed features represent meaningful improvements in the field of stock monitoring systems and solve specific technical problems that are rooted in technological challenges, rather than merely automating routine human activity using a conventional computer.

Referring to FIG. 1A, a system is shown to acquire and filter a set of stocks, in accordance with embodiments of the present invention. An initial unfiltered set of stocks 120 is created by accessing one or more daily lists. The lists 110 may be publicly available over from an online source and accessible over network 210. Lists 110 can be stored in a data store 230, which is controlled by a server or other computing device 222. In one embodiment, one of the lists 110 can be an INVESTOR'S BUSINESS DAILY (IBD) list or a daily stock list provided by the ASSOCIATION OF CHARTERED CERTIFIED ACCOUNTANTS (ACCA). In a further embodiment, the unfiltered list can be a mathematical intersection of unique stocks contained in both the IBD and ACCA daily lists. Other set of operations can be formed to join a set of multiple daily lists 110 to create the unfiltered set 120. Further other sources can be used for the daily lists 110, which provide their own unique advantages.

Once the unfiltered set 120 is established and/or created, a filter 130 can be applied, which reduces the set 120, which typically includes over 100 unique stocks to the post-filter set 144. In one embodiment, a fixed or configurable quantity, referred to as the primary quantity, can be set for the post-filter set 144. In a preferred embodiment, the primary quantity is five. Once the post-filter set 144 is created, the stocks 148 contained therein can be simultaneously displayed 146, such as on computing device 220. One non-limiting example of such as display is provided by FIG. 2L.

In one embodiment, additional information, referred to as filter data 112 can be extracted over network 210 from one or more sources to be used by the filter 130. The obtained data 112 can be stored in data store 232 and controlled by server or computing device 224. In one embodiment, end of day stock information is included in the filter data 112. A source for the filter data 112 can be EODDATA.COM, which provides end of day stock market data and historical quotes for many exchanges including NASDAQ, NYSE, AMEX, TSX, and OTCBB. Other sources include those provided by GOOGLE, YAHOO!, and MSN. AMIBROKER comes with a free tool called AMIQOTE able to directly import YAHOO! data. Use of a free tool is may be beneficial to a trader with limited resources, who do not wish to incur monthly investments for stock data. STOCKDATA (e.g., STOCKDATA.org) also provides a free real-time, intraday and historical stock data API, which is usable in embodiments. Any source able to provide filter data 112 sufficient for the purposes of filter 130, as described herein, may be utilized, as can be understood by one of ordinary skill in the art.

Stock information 114 conveyed over network 210 to update displayed stock 148 information about the stocks in set 144 can be obtained from one or more sources. The stock information 114 is stored in a data store 234 controlled by server or computing device 236. In embodiments, the stock information 114 is obtained from POLYGON.IO and/or YAHOO.COM. Other sources of stock information 114 include, but are not limited to: ALPHAVANTAGE.CO, FINNHUB.IO, IX CLOUD.IO, ALPACA.MARKETS and MARKETSTACK.COM.

In general, the filter 130 uses historical information, often limited to a single prior day, to determine five stocks (in the set 144) of interest having a high probability of having an average (close-low) percentage change greater than three (3) percent (%). More specifically, the goal for every trading day is to identify five or fewer unique stocks that are placed in set 144. An average % change (close-low) for the stocks in the set 144 should be ideally 3% or greater, although the best % change can occur hours before a close of the trading day. The filter 130 generally utilizes multiple steps or sub-filters, which include a performance filter(s) 132 and a set of ranking filter(s) 134. Preferably, performance filtering is performed before filtering based on rank. Preferably, each successive step of filtering (via filter 130) results in an increased average ¾ change (close-low) for the remaining stocks. The various steps involving the sub-filters occur in a defined order, where the steps exit once a quantity of stocks remaining is equal to or less than the primary quantity, which is preferably five. FIG. 2B provides stepwise details of this process consistent with FIG. 1A.

Figure 1B:
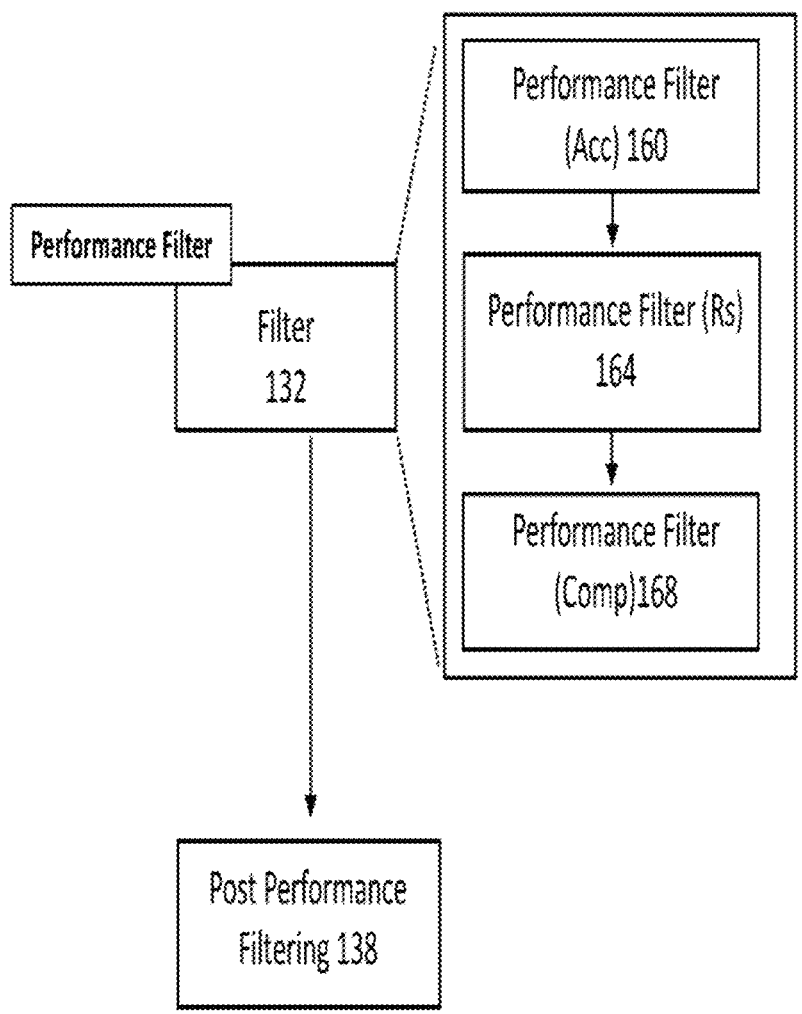
FIG. 1B depicts a block diagram for performance filtering a set of stocks, in accordance with embodiments of the present invention.

With reference to FIG. 1B, performance filter 132 can be performed in stages, where the first is a filter 160 based on Acc, a second is a filter 164 based on Rs, and a third is a filter 168 based on Comp. Results from post-performance filtering 138 can be used as input for ranking filter 134. Filter 160 can utilize one of an A ccPos and A ccNeg list. Filter 164 can utilize one of an RsPos and RsNeg list. Filter 168 can use one of a CompPos and CompNeg list. The Pos or Neg list that provides a greater number of unique stocks is the one used, when there is a selection between two lists.

Figure 1C:
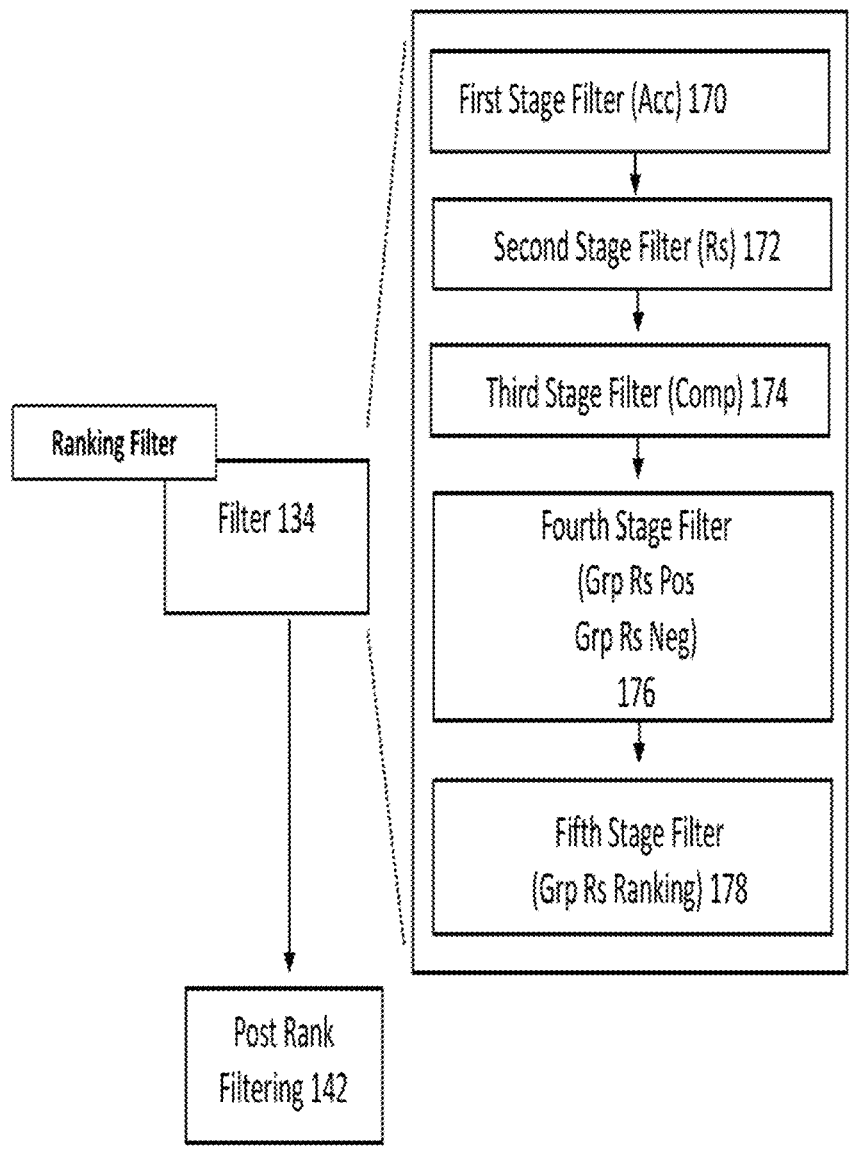
FIG. 1C depicts a block diagram for rank filtering a set of stocks, in accordance with embodiments of the present invention.

With reference to FIG. 1C, ranking filtering can be performed in stages, where the first is a filter 170 based on Acc, a second is a filter 172 based on Rs, a third is a filter 174 based on Comp, a fourth is a filter 176 based on GrpRs Pos and GrpRs Neg, and a fifth is a filter 178 based on GrpRs ranking. Parameters of the several types are selected based on those that yield a greater number of results.

By default, once subset 142 only include the primary quantity, it is considered the set 144 and filtering operations are terminated. Filtering operations may terminate early, however, based upon reaching the primary quantity through an earlier sequenced filtering operation. Although in a preferred embodiment, the filtering operations depicted and the order are significant, other embodiments can alter the order and still be considered within scope of the disclosure.

Figure 2A:
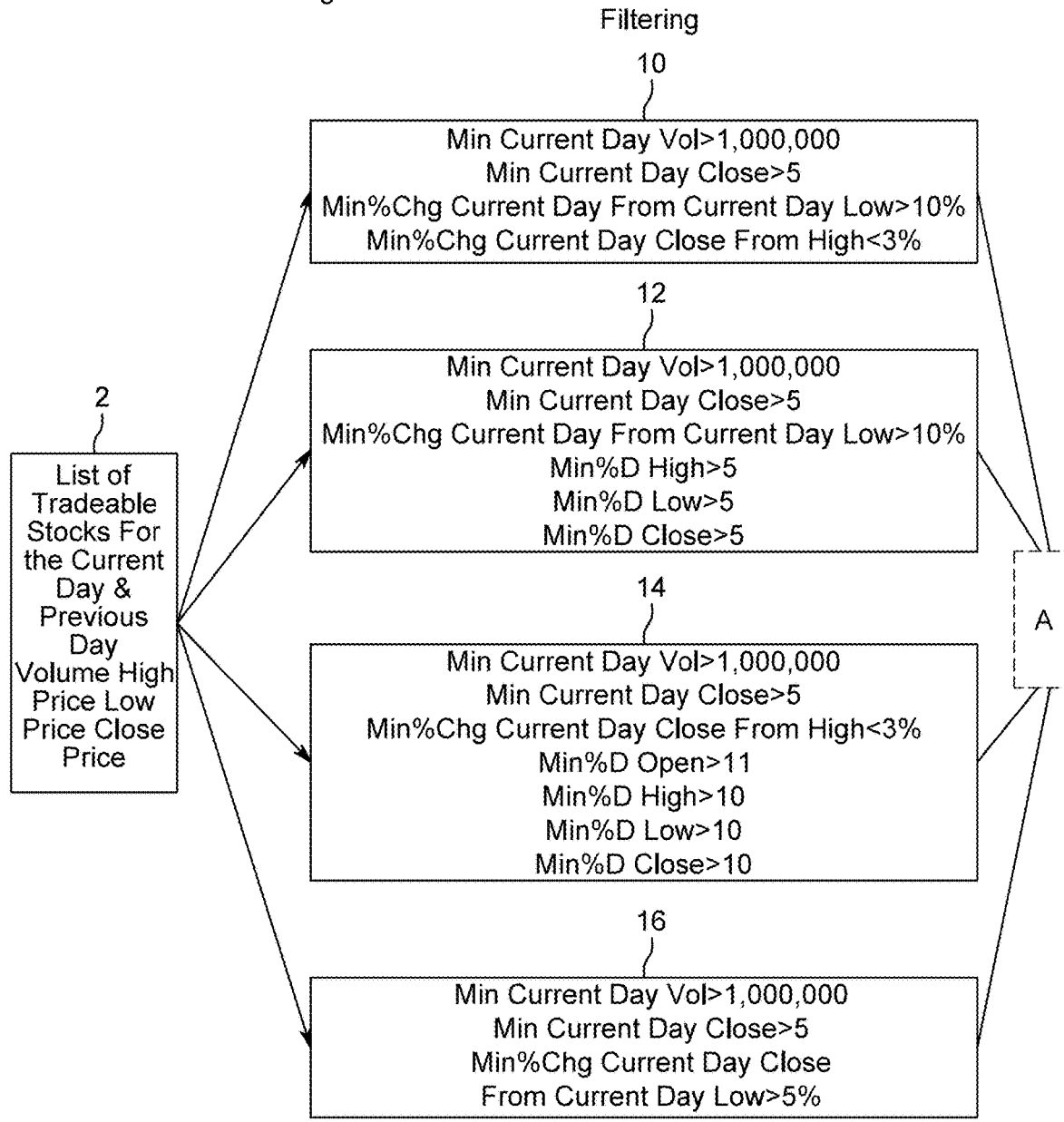
FIG. 2A provides a detailed diagram for an embodiment of creating small listings having the primary quantity (e.g., 5) number of stocks of interest, in accordance with embodiments of the present invention.
Figure 2A:
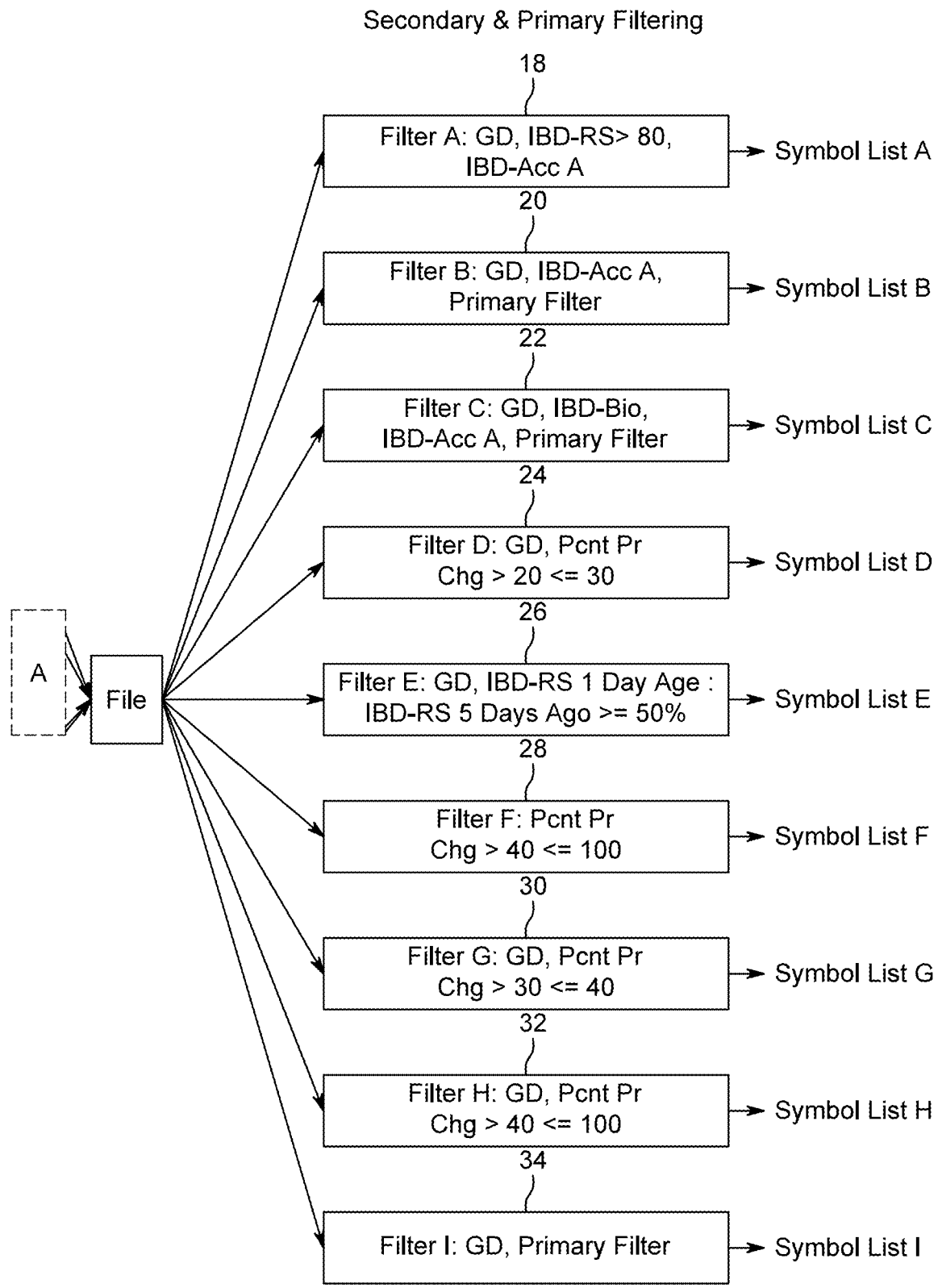

As shown in FIG. 2A, the first sub-filter threshold can filter out stocks based on the minimum current day volume (e.g., 1 million), minimum current day close (e.g., >5), minimum % change day from current day low (>10%), minimum % change current day close from high (<3%), and the like. Note that FIG. 2A shows a generation of multiple different post-primary-filter sets 144, which result from application of different filters (e.g., Filters A-I to generate sets A-I).

In some embodiments, a method for filtering tradable stocks may include a list of tradable stocks 2 being initially provided, including stock data for the current day and the previous day, such as volume, high price, low price, and close price values. At block 10, a first filtering operation is performed. In some embodiments, stocks are filtered based on a minimum current day trading volume of greater than or equal to 1,000,000 shares, a minimum current day closing price greater than 5, a minimum percentage change from the current day low greater than 10%, and a minimum percentage change from the current day close relative to the current day high of less than 3%. At block 12, a second filtering operation is performed. Stocks are filtered based on a minimum current day trading volume of greater than or equal to 1,000,000 shares, a minimum current day close greater than 5, a minimum percentage change from the current day low greater than 10%, a minimum five-day high percentage greater than 5%, and a minimum five-day low percentage greater than 5%. At block 14, a third filtering operation is performed. In this embodiment, stocks are selected based on a minimum current day trading volume greater than or equal to 1,000,000 shares, a minimum current day close greater than 5, a minimum percentage change from the current day low greater than 0%, a minimum five-day high percentage greater than 10%, and a minimum five-day low percentage greater than 10%.

At block 16, a fourth filtering operation is performed. Stocks are selected based on a minimum current day trading volume greater than or equal to 1,000,000 shares, a minimum current day close greater than 5, and a minimum percentage change from the current day close relative to the low greater than 9%.

After completion of the initial filtering stage, the stocks are processed through a secondary and primary filtering stage. At block 18, a secondary filter is applied based on growth and decline (GD), IBD relative strength (IBD-RS) greater than 80, and IBD accumulation rating A (IBD-Acc A) criteria, generating Symbol List A. At block 20, another secondary filter is applied based on GD, IBD-Acc A, and a primary filter, generating Symbol List B.

At block 22, a filter based on GD, IBD earnings per share rating (IBD-EPS), IBD-Acc A, and a primary filter is applied to generate Symbol List C. At block 24, stocks are filtered based on GD and a portfolio percentage change greater than 30%, generating Symbol List D. At block 26, stocks are filtered based on GD and historical IBD relative strength rankings, specifically where IBD-RS one day ago and IBD-RS five days ago are both greater than 50%, to generate Symbol List E.

At block 28, a filtering operation is performed based on GD and a portfolio percentage change greater than 40%, generating Symbol List F. At block 30, stocks are filtered based on GD and a portfolio percentage change greater than 30%, generating Symbol List G. At block 32, a similar filtering process is applied based on GD and a portfolio percentage change greater than 30%, generating Symbol List H. At block 34, stocks are filtered based on GD and a primary filter to generate Symbol List I.

Definitions for the filtering criteria are provided in FIG. 2A and include the following: (1) "% D Open" is calculated as ((Current Day Open−Previous Day Open)/Previous Day Open)×100; (2) "% D High" is calculated as ((Current Day High−Previous Day High)/Previous Day High)×100; (3) "% D Low" is calculated as ((Current Day Low-Previous Day Low)/Previous Day Low)×100; (4) "% D Close" is calculated as ((Current Day Close-Previous Day Close)/Previous Day Close)×100; and (5) "Port % Change" is calculated as (Price Change/Price)×100.

The goal of the method, as indicated in FIG. 2A, is to generate symbol lists each day containing five (5) or fewer stocks, with the average percentage change from the close to the low price for the included stocks being at least three percent (3%) or greater.

In some embodiments, backtesting is conducted using a backtest average file, which is derived from, for example, a ten-day moving average of individual daily backtest performance files. Each of these daily performance files is generated after the close of the trading day and captures metrics for a wide array of symbol lists. In some embodiments, the daily backtest file includes the percentage of symbols within each list that experienced a price increase, a price decrease, or remained unchanged. The resulting ten-day moving average of these daily metrics is compiled into the backtest average file, which plays a key role in the primary filtering process used in trading analysis.

The lists evaluated span various categories and performance segments, including but not limited to: a wide range of classifications such as IBD-AccA, IBD-AccB, IBD-AccC, IBD-AccD, IBD-AccDis-NegPerformance, IBD-AccDis-PosPerformance, IBD-AccE, IBD-AvgVolGt100kLt200k, IBD-AvgVolGt200kLt400k, IBD-AvgVolGt400kLt800k, IBD-AvgVolGt800k, IBD-AvgVolLt100k, IBD-AvgVolSymbolsGT200K, IBD-CompGt10Le20, IBD-CompGt20Le40, IBD-CompGt40Le80, IBD-CompGt80, IBD-CompLe10, IBD-Comp-NegPerformance, IBD-Comp-PosPerformance, IBD-EpsGt10Le20, IBD-EpsGt20Le40, IBD-EpsGt40Le80, IBD-EpsGt80, IBD-EpsLe10, IBD-EPS-NegPosPerformance, IBD-EPS-PosPerformance, IBD-GD, IBD-GrpRsA, IBD-GrpRsB, IBD-GrpRsC, IBD-GrpRsD, IBD-GrpRsE, IBD-grpRS-NegPerformance, IBD-grpRS-PosPerformance, IBD-PcntPrChgGtOL ePos5, IBD-PcntPrChgGtNeg100LeNeg40, IBD-PcntPrChgGtNeg10LeNeg5, IBD-PcntPrChgGtNeg20LeNeg10, IBD-PcntPrChgGtNeg30LeNeg20, IBD-PontPrChgGtNeg40LeNeg30, IBD-PcntPrChgGtNeg5Le0, IBD-PcntPrChgGtPos10LePos20, IBD-PcntPrChgGtPos20LePos30, IBD-PcntPrChgGtPos30LePos40, IBD-PcntPrChgGtPos40LePos100, IBD-PcntPrChgGtPos5LePos10, IBD-PontVolChgGeOLePos5, IBD-PcntVolChgGeNeg100LeNeg40, IBD-PontVolChgGt100LePos200, IBD-PcntVolChgGt10LePos20, IBD-PcntVolChgGt1600LePos3200, IBD-PcntVolChgGt200LePos400, IBD-PontVolChgGt20LePos30, IBD-PcntVolChgGt30LePos40, IBD-PcntVolChgGt3200, IBD-PontVolChgGt400LePos800, IBD-PontVolChgGt40LePos100, IBD-PcntVolChgGt5LePos10, IBD-PontVolChgGt800LePos1600, IBD-PontVolChgGtNeg10LeNeg5, IBD-PontVolChgGtNeg20LeNeg10, IBD-PcntVolChgGtNeg30LeNeg20, IBD-PcntVolChgGtNeg40LeNeg30, IBD-PcntVolChgGtNeg5LT0, IBD-PontVolChgLTNeg100, IBD-PontVolChgNeg, IBD-PontVolChgPos, IBD-PontVolChgUnch, IBD-PrChgNeg, IBD-PrChgPos, IBD-PrChgUnch, IBD-PrGt10Le20, IBD-PrGt20Le40, IBD-PrGt40Le80, IBD-PrGt5L e10, IBD-PrGt80, IBD-PrLt5, IBD-RsGt10Le20, IBD-RsGt20Le40, IBD-RsGt40L e80, IBD-RsGt80, IBD-RsLe10, IBD-RS-NegPerformance, IBD-RS-PosPerformance, IBD-SmrA, IBD-SmrB, IBD-SmrC, IBD-SmrD, IBD-SmrE, IBD-SMR-NegPerformance, IBD-SMR-PosPerformance, IBD-SpecHph, IBDGroup_Aerospace-Defense, IBDGroup_AgriculturalOperations, IBDGroup_Apparel-ClothingMfg, IBDGroup_Apparel-Shoes&RelMfg, IBDGroup_AutoManufacturers, IBD-Group_Auto-Truck-OriginalEqp, IBDGroup_Auto-Truck-ReplaceParts, IBDGroup_Auto-Truck-Tires&Misc, IBDGroup_Banks-Foreign, IBDGroup_Banks-Midwest, IBDGroup_Banks-MoneyCenter, IBDGroup_Banks-Northeast, IBDGroup_Banks-Southeast, IBDGroup_Banks-SuperRegional, IBDGroup_Banks-West-Southwest, IBD-Group_Beverages-Alcoholic, IBDGroup_Beverages-Non-Alcoholic, IBDGroup_Bldg-A-C&Heating Prds, IBDGroup_Bldg-Cement-Concrt-Ag, IBDGroup_Bldg-ConstrPrds-Misc, IBDGroup_Bldg-HandTools, IBDGroup_Bldg-HeavyConstruction, IBDGroup_Bldg-Maintenance&Svc, IBDGroup_Bldg-Mobile-Mfg&Rv, IBDGroup_Bldg-Resident-Comml, IBDGroup_Bldg-WoodPrds, IBDGroup_Chemicals-Agricultural, IBDGroup_Chemicals-Basic, IBDGroup_Chemicals-Paints, IBDGroup_Chemicals-Plastics, IBDGroup_Chemicals-Specialty, IBDGroup_CommlSvcs-Advertising, IBD-Group_CommlSvcs-Consulting, IBDGroup_CommlSvcs-DocumentMgmt, IBDGroup_CommlSvcs-Healthcare, IBDGroup_CommlSvcs-Leasing, IBDGroup_CommlSvcs-MarketRsrch, IBDGroup_CommlSvcs-Outsourcing, IBD-Group_CommlSvcs-Staffing, IBDGroup_CompSftwr-SpecEnterprs, IBDGroup_Computer-DataStorage, IBDGroup_Computer-Hardware-Perip, IBDGroup_Computer-IntegratedSyst, IBDGroup_Computer-Networking, IBDGroup_ComputerSftwr-Database, IBDGroup_ComputerSftwr-Design, IBDGroup_ComputerSftwr-Desktop, IBDGroup_ComputerSftwr-Edu-Media, IBDGroup_ComputerSftwr-Enterprse, IBDGroup_ComputerSftwr-Financial, IBDGroup_ComputerSftwr-Gaming, IBDGroup_ComputerSftwr-Medical, IBDGroup_ComputerSftwr-Security, IBDGroup_Computer-TechServices, IBDGroup_ConsumerProd-Electronic, IBDGroup_ConsumerProd-Specialty, IBDGroup_ConsumerSvcs-Education, IBDGroup_Containers-Packaging, IBDGroup_Cosmetics-PersonalCare, IBD-Group_DiversifiedOperations, IBDGroup_Elec-ContractMfg, IBDGroup_Elec-MiscProducts, IBDGroup_Elec-Scientific-Msrng, IBDGroup_Elec-SemicondctorFablss, IBDGroup_Elec-SemiconductorEquip, IBDGroup_Elec- SemiconductorMfg, IBDGroup_Electrical-Power-Equipmt, IBDGroup_Electronic-Parts, IBDGroup_Energy-Alternative-Other, IBDGroup_Energy-Coal, IBDGroup_Energy-Solar, IBDGroup_Finance-BlankCheck, IBDGroup_Finance-CommercialLoans, IBDGroup_Finance-ConsumerLoans, IBDGroup_Finance-CrdtCard-PmtPr, IBDGroup_Finance-ETF-ETN, IBDGroup_Finance-InvestBnk-Bkrs, IBDGroup_Finance-InvestmentMgmt, IBDGroup_Finance-MortgageREIT, IBD Group_Finance-Mrtg&RelSvc, IBDGroup_Finance-PropertyREIT, IBDGroup_Finance-PublInvFd-Bal, IBDGroup_Finance-PublInvFd-Bond, IBDGroup_Finance-PublInvFd-Eqt, IBDGroup_Finance-PublInvFd-Glbl, IBDGroup_Finance-Savings& Loan, IBDGroup_FinancialSvcs-Specialty, IBDGroup_Food-Confectionery, IBDGroup_Food-DairyProducts, IBDGroup_Food-Grain&Related, IBDGroup_Food-MeatProducts, IBDGroup_Food-MiscPreparation, IBDGroup_Food-Packaged, IBDGroup_FuneralSvcs&Rel, IBDGroup_Groupnotavailable, IBDGroup_Hsehold-Appliances-Wares, IBDGroup_Hsehold-OfficeFurniture, IBDGroup_Insurance-Acc&Health, IBDGroup_Insurance-Brokers, IBDGroup_Insurance-Diversified, IBDGroup_Insurance-Life, IBDGroup_Insurance-Prop-Cas-Titl, IBDGroup_Internet-Content, IBDGroup_Internet-NetworkSltns, IBDGroup_Leisure-Gaming-Equip, IBDGroup_Leisure-Lodging, IBDGroup_Leisure-Movies& Related, IBDGroup_Leisure-Products, IBDGroup_Leisure-Services, IBDGroup_Leisure-Toys-Games-Hobby, IBDGroup_Leisure-TravelBooking, IBDGroup_Machinery-Constr-Mining, IBDGroup_Machinery-Farm, IBDGroup_Machinery-GenIndustrial, IBDGroup_Machinery-MtlHdlg-Autmn, IBDGroup_Machinery-Tools&Rel, IBDGroup_Media-Books, IBDGroup_Media-Diversified, IBDGroup_Media-Newspapers, IBDGroup_Media-Radio-Tv, IBDGroup_Medical-Biomed-Biotech, IBDGroup_Medical-Diversified, IBDGroup_Medical-EthicalDrugs, IBDGroup_Medical-GenericDrugs, IBDGroup_Medical-Hospitals, IBDGroup_Medical-Long-termCare, IBDGroup_Medical-ManagedCare, IBDGroup_Medical-Outpnt-HmCare, IBDGroup_Medical-Products, IBDGroup_Medical-ResearchEqp-Svc, IBDGroup_Medical-Services, IBDGroup_Medical-Supplies, IBDGroup_Medical-Systems-Equip, IBDGroup_Medical-WhlsleDrg-Suppl, IBDGroup_MetalPrds-Distributor, IBDGroup_MetalProc&Fabrication, IBDGroup_Mining-Gold-Silver-Gems, IBDGroup_Mining-MetalOres, IBDGroup_OfficeSuppliesMfg, IBDGroup_Oil&Gas-CdnExpl&Prod, IBDGroup_Oil&Gas-Drilling, IBDGroup_Oil&Gas-FieldServices, IBDGroup_Oil&Gas-Integrated, IBDGroup_Oil&Gas-IntlExpl&Prod, IBDGroup_Oil&Gas-Machinery-Equip, IBD Group_Oil&Gas-Refining-Mktg, IBDGroup_Oil&Gas-RoyaltyTrust, IBDGroup_Oil&Gas-Transprt-Pipelne, IBDGroup_Oil&Gas-USExpl&Prod, IBDGroup_Paper&PaperProducts, IBDGroup_Pollution-Control, IBDGroup_RealEstateDvlpmt-Ops, IBDGroup_Retail-Apparel-Shoes-Acc, IBDGroup_Retail-Consumer-Elec, IBDGroup_Retail-DepartmentStores, IBDGroup_Retail-Discount&Variety, IBDGroup_Retail-DrugStores, IBDGroup_Retail-HomeFurnishings, IBDGroup_Retail-Internet, IBDGroup_Retail-LeisureProducts, IBDGroup_Retail-MailOrder& Direct, IBDGroup_Retail-MajorDiscChains, IBDGroup_Retail-Restaurants, IBDGroup_Retail-Specialty, IBDGroup_Retail-Super-MiniMkts, IBDGroup_Retail-Whlsle-Automobile, IBDGroup_Retail-Whlsle-AutoParts, IBDGroup_Retail-Whlsle-BldgPrds, IBDGroup_Retail-Whlsle-Jewelry, IBDGroup_Retail-Whlsle-OfficeSup, IBDGroup_Security-Sfty, IBDGroup_Soap&ClngPreparatns, IBDGroup_Steel-Producers, IBDGroup_Steel-SpecialtyAlloys, IBDGroup_Telecom-Cable-SatlEqp, IBDGroup_Telecom-ConsumerProds, IBDGroup_Telecom-FiberOptics, IBDGroup_Telecom-Infrastructure, IBDGroup_TelecomSvcs-Cable-Satl, IBDGroup_TelecomSvcs-Foreign, IBDGroup_TelecomSvcs-Integrated, IBDGroup_TelecomSvcs-Wireless, IBDGroup_Tobacco, IBDGroup_Transport-AirFreight, IBDGroup_Transportation-Airline, IBDGroup_Transportation-EquipMfg, IBDGroup_Transportation-Logistics, IBDGroup_Transportation-Rail, IBDGroup_Transportation-Ship, IBDGroup_Transportation-Truck, IBDGroup_Trucks&Parts-HvyDuty, IBDGroup_Utility-Diversified, IBDGroup_Utility-ElectricPower, IBDGroup_Utility-GasDistribution, IBDGroup_Utility-WaterSupply, IBDGroup_Wholesale-Electronics, IBDGroup_Wholesale-Food.

Each of these categories contributes to the daily snapshot and the smoothed ten-day backtest average, which collectively inform the selection and filtering of symbols in the overall trading system.

With reference to FIG. 2B, in indicated Step 1, the unfiltered set 120 is selected. With reference to Step 2 of FIG. 2B, the filter 132 is applied to filter out stocks having less than 800,000 shares by 50 day moving average. With reference to Step 3, performance filter 132 is applied. With reference to Step 3A, the Acc performance filter 160 is applied. AccPos or A ccNeg is selected based on which yields the most symbols. If A ccPos and AccNeg files yield the same number of symbols then select the AccPos or AccNeg file with the higher FileUnderTest/Backtest. If both AccPos and AccNeg files have the same FileUnderTest/Backtest, then AccPos is used. With reference to Step 3B, the Rs performance filter 164 is applied. RsPos or RsNeg is selected based on which yields the most symbols. IfRsPos and RsNeg files yield the same number of symbols then the RsPos or RsNeg file with the higher FileUnderTest/Backtest is selected. If both RsPos and RsNeg files have the same FileUnderTest/Backtest, then RsPos is used. With reference to Step 3C, the Comp performance filter 168 is applied. CompPos or CompNeg is selected based on which yields the most symbols. If CompPos and CompNeg files yield the same number of symbols then the CompPos or CompNeg file with the higher FileUnderTest/Backtest is selected. If both CompPos and CompNeg files have the same FileUnderTest/Backtest, then CompPos is used.

The lists of prior trading symbols are categorized based on whether specific metrics increased or decreased compared to the day preceding the prior trading day. AccPos includes symbols for which the Acc value increased, while RsPos, CompPos, GrpRsPos, and SmrPos include symbols showing increases in the Rs, Comp, GrpRs, and Smr values, respectively. Conversely, AccNeg captures symbols where the Acc value decreased, and similarly, RsNeg, CompNeg, GrpRsNeg, and SmrNeg list symbols where the Rs, Comp, GrpRs, and Smr values declined from the trading day just before the prior trading day.

In particular, AccPos is the list of the prior trading symbols where the Acc value increased from the trading day just before the prior trading day. RsPos is the list of the prior trading symbols where the Rs value increased from the trading day just before the prior trading day. CompPos is the list of the prior trading symbols where the Comp value increased from the trading day just before the prior trading day. GrpRsPos is the list of the prior trading symbols where the GrpRs value increased from the trading day just before the prior trading day. SmrPos is the list of the prior trading symbols where the Smr value increased from the trading day just before the prior trading day. A ccNeg is the list of the prior trading symbols where the Acc value decreased from the trading day just before the prior trading day. RsNeg is the list of the prior trading symbols where the Rs value decreased from the trading day just before the prior trading day. CompNeg is the list of the prior trading symbols where the Comp value decreased from the trading day just before the prior trading day. GrpRsNeg is the list of the prior trading symbols where the GrpRs value decreased from the trading day just before the prior trading day. SmrNeg is the list of the prior trading symbols where the Smr value decreased from the trading day just before the prior trading day.

As indicated by Step 4, filter 134 is applied. With reference to Step 4A, filter 170 is applied. Acc parameter is selected based on which yields the most symbols. When two or more Acc parameters yield the same highest number of symbols, then the Acc parameter with the higher FileUnderTest/Backtest is selected. If these Acc parameters have the same FileUnderTest/Backtest, then the parameter with the higher IBD rating is selected.

With reference to Step 4B, filter 172 is applied. Rs parameter is selected based on which yields the most symbols. When two or more Rs parameters yield the same highest number of symbols, then the Rs parameter with the higher FileUnderTest/Backtest is selected. If Rs parameters have the same FileUnderT est/Backtest, then the parameter with the higher IBD rating is selected.

With reference to Step 4C, filter 174 is applied. Comp parameter is selected based on which yields the most symbols. When two or more Comp parameters yield the same highest number of symbols, then the Comp parameter is selected with the higher FileUnderTest/Backtest. If the Comp parameters have the same FileUnderTest/Backtest, then the parameter with the higher IBD rating is selected.

With reference to Step 4D, filter 176 is applied. GrpRsPos or GrpRsNeg is selected based on which yields the most symbols. When GrpRsPos and GrpRsNeg yield the same number of symbols, then GrpRsPos or GrpRsNeg with the higher FileUnderTest/Backtest is selected. If GrpRsPos and GrpRsNeg have the same FileUnderTest/Backtest, then GrpRsPos is selected.

With reference to Step 4E, filter 178 is applied. GrpRs parameter is selected based on which yields the most symbols. When two or more GrpRs parameters yield the same highest number of symbols, then the GrpRs parameter with the higher FileUnderTest/Backtest is selected. If these GrpRs parameters have the same FileUnderTest/Backtest, then the parameter with the higher IBD rating is selected.

Figure 2C:
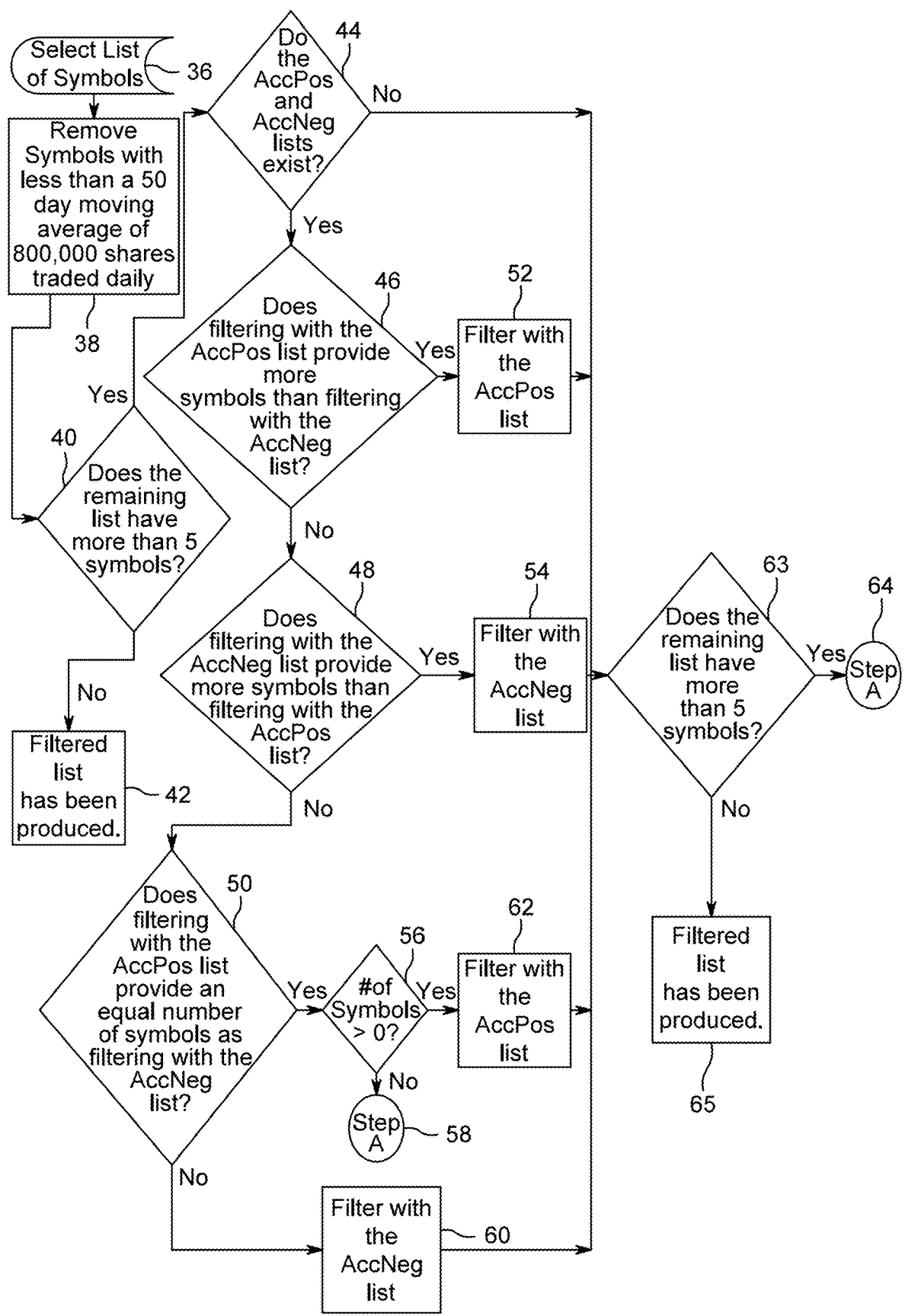

FIG. 2C through 2K depict detailed flow charts depicting an embodiment of the process detailed in pictorial form explained in context of FIG. IA-C. As shown in FIG. 2C, a method for refining a list of tradable stock symbols is illustrated, according to some embodiments of the present disclosure. At block 36, the method begins by selecting a list of symbols. At block 38, the method includes removing symbols that have a 50-day moving average trading volume of less than 800,000 shares per day. At block 40, the method determines whether the remaining list contains more than five (5) symbols. If the remaining list has five or fewer symbols, the method proceeds to block 42, where the filtered list is finalized and produced. If the remaining list still contains more than five (5) symbols, the method proceeds to block 44, where it is determined whether both the AccPos list and the A ccNeg list exist. If neither list exists, the method continues along the right path directly to block 63, discussed below. If both the AccPos and A ccNeg lists exist, the method proceeds to block 46, where it is determined whether filtering with the AccPos list produces more symbols than filtering with the AccNeg list. If so, at block 52, filtering is performed using the AccPos list.

If filtering with the AccPos list does not provide more symbols, the method proceeds to block 48, where it is determined whether filtering with the AccNeg list provides more symbols than filtering with the AccPos list. If so, at block 54, filtering is performed using the A ccNeg list. If neither the AccPos list nor the A ccNeg list provides more symbols, the method advances to block 50, where it is determined whether filtering with the AccPos list provides an equal number of symbols as filtering with the AccNeg list. If not, the method proceeds to block 60, where filtering is performed using the A ccNeg list. If the number of symbols is equal, the method proceeds to block 56, where the filtered list is evaluated for size.

At block 56, it is determined whether the number of symbols after filtering is greater than five. If the number is greater than five, filtering is performed with the AccPos list at block 62. If the number is five or fewer, the method proceeds to block 58 to Step A. Step A represents a repeated loop back into the method to perform additional filtering actions. At block 63, if at any point a filtered list is produced and it is determined that the remaining list still contains more than five (5) symbols, the method returns to Step A for further filtering. If the list contains five (5) or fewer symbols, the method proceeds to block 65, where the final filtered list is produced. Thus, FIG. 2C illustrates an iterative decision-making process for refining a list of tradable symbols based on volume thresholds, existence of supplemental filter lists (A ccPos and A ccNeg), and comparative filtering strategies to achieve a filtered stock list containing no more than five (5) symbols optimized for further monitoring and trading strategies.

Figure 2D:
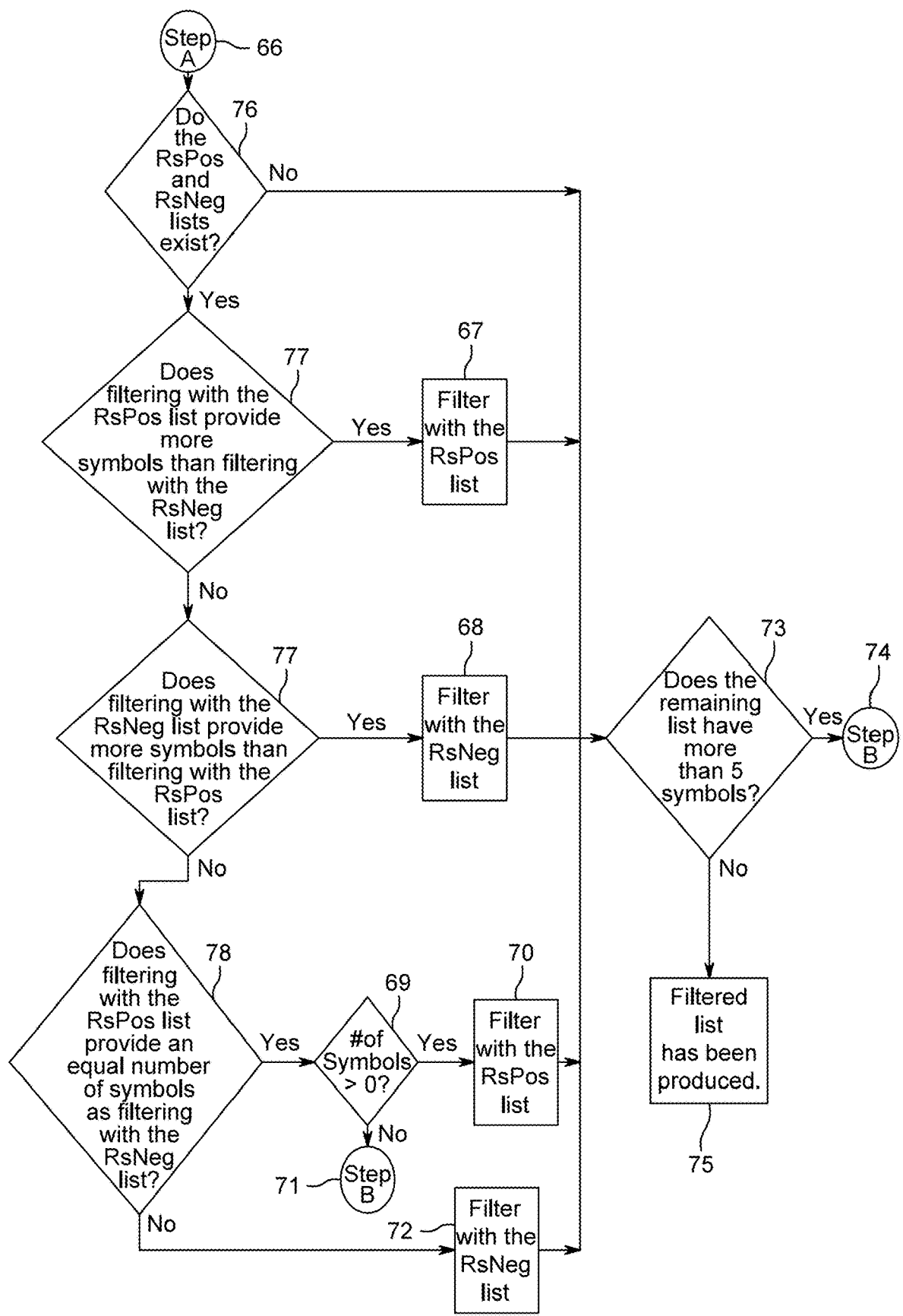

As shown in FIG. 2D, a method for further filtering a list of stock symbols is illustrated, according to some embodiments of the present disclosure. The method begins at block 66, where Step A is entered from the preceding filtering process (e.g., as shown in FIG. 2C). At block 76, it is determined whether both the RsPos list and the RsNeg list exist. If neither list exists, the method proceeds directly to block 73, discussed further below. If both lists exist, the method proceeds to block 77, where it is determined whether filtering with the RsPos list provides more symbols than filtering with the RsNeg list. If so, the method continues to block 67, where filtering is performed using the RsPos list.

If filtering with the RsPos list does not provide more symbols, the method proceeds to block 77, where it is determined whether filtering with the RsNeg list provides more symbols than filtering with the RsPos list. If so, the method continues to block 68, where filtering is performed using the RsNeg list. If neither the RsPos list nor the RsNeg list results in a greater number of symbols, the method advances to block 78, where it is determined whether filtering with the RsPos list produces an equal number of symbols compared to filtering with the RsNeg list. If the number of symbols is equal, the method proceeds to block 69, where the resulting number of symbols is evaluated. At block 69, it is determined whether the number of filtered symbols is greater than five. If the number of symbols is greater than five, filtering is performed with the RsPos list at block 70. If the number is five or fewer, the method proceeds to block 71, where Step B is entered for further processing.

If, at block 78, filtering with the RsPos list does not produce an equal number of symbols compared to filtering with the RsNeg list, filtering is performed with the RsNeg list at block 72. Following any of the filtering operations, the method proceeds to block 73, where it is determined whether the resulting list contains more than five (5) symbols. If the list contains more than five symbols, the method moves to Step B at block 74 to perform additional filtering iterations. If the list contains five or fewer symbols, the method proceeds to block 75, where the final filtered list is produced. Thus, FIG. 2D illustrates an iterative and comparative decision-making process that further refines stock symbol lists based on the existence and performance of RsPos and RsNeg supplemental lists, with the goal of producing a final stock list of five or fewer symbols suitable for trading actions.

Figure 2E:
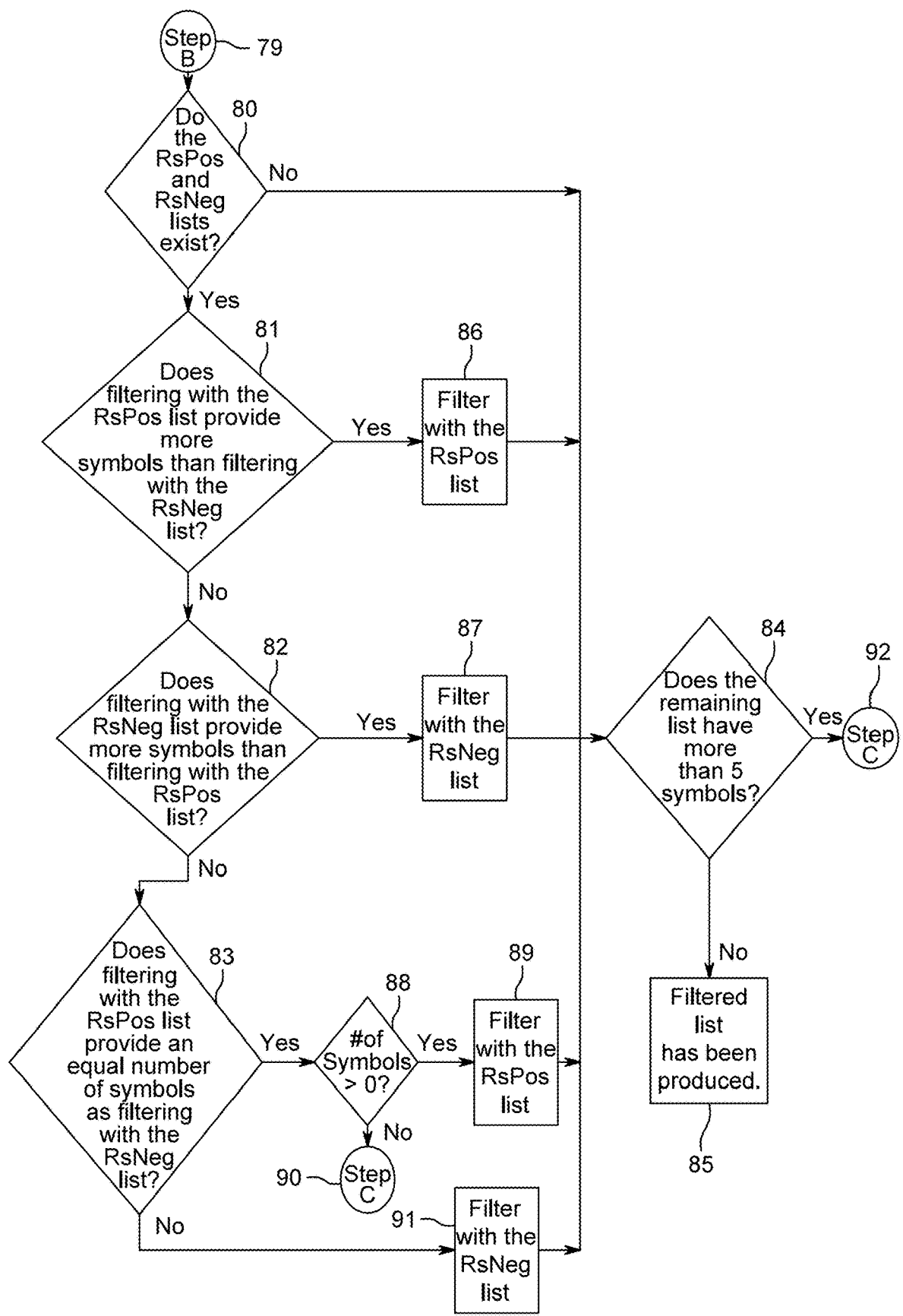

As shown in FIG. 2E, a method for further refining a filtered list of stock symbols is illustrated, according to some embodiments of the present disclosure. The method begins at block 79, where Step B is entered from the preceding filtering process (e.g., from FIG. 2D). At block 80, the method determines whether both the RsPos list and the RsNeg list exist. If neither list exists, the method proceeds directly to block 84, discussed below. If both lists exist, the method proceeds to block 81, where it is determined whether filtering with the RsPos list produces more symbols than filtering with the RsNeg list. If so, the method proceeds to block 86, where filtering is performed using the RsPos list. If filtering with the RsPos list does not provide more symbols, the method proceeds to block 82, where it is determined whether filtering with the RsNeg list produces more symbols than filtering with the RsPos list. If so, the method proceeds to block 87, where filtering is performed using the RsNeg list. If neither the RsPos list nor the RsNeg list produces more symbols, the method advances to block 83, where it is determined whether filtering with the RsPos list provides an equal number of symbols compared to filtering with the RsNeg list. If not, the method proceeds to block 91, where filtering is performed using the RsNeg list.

If the number of symbols produced by filtering with the RsPos list and RsNeg list is equal, the method proceeds to block 88, where it is determined whether the number of filtered symbols exceeds zero (0). If the number is greater than zero, filtering is performed with the RsPos list at block 89. If the number is 0 or fewer, the method proceeds to block 90, where Step C is entered for additional processing. After any of the filtering operations, the method proceeds to block 84, where it is determined whether the resulting list contains more than five (5) symbols. If the list contains more than five symbols, the method moves to Step C, at block 92. If the list contains five or fewer symbols, the method proceeds to block 85, where the final filtered list is produced. Thus, FIG. 2E illustrates a continued iterative and comparative filtering decision process, using the RsPos and RsNeg lists to ensure that the final stock symbol list is refined to no more than five (5) symbols optimized for targeted trading.

Figure 2F:
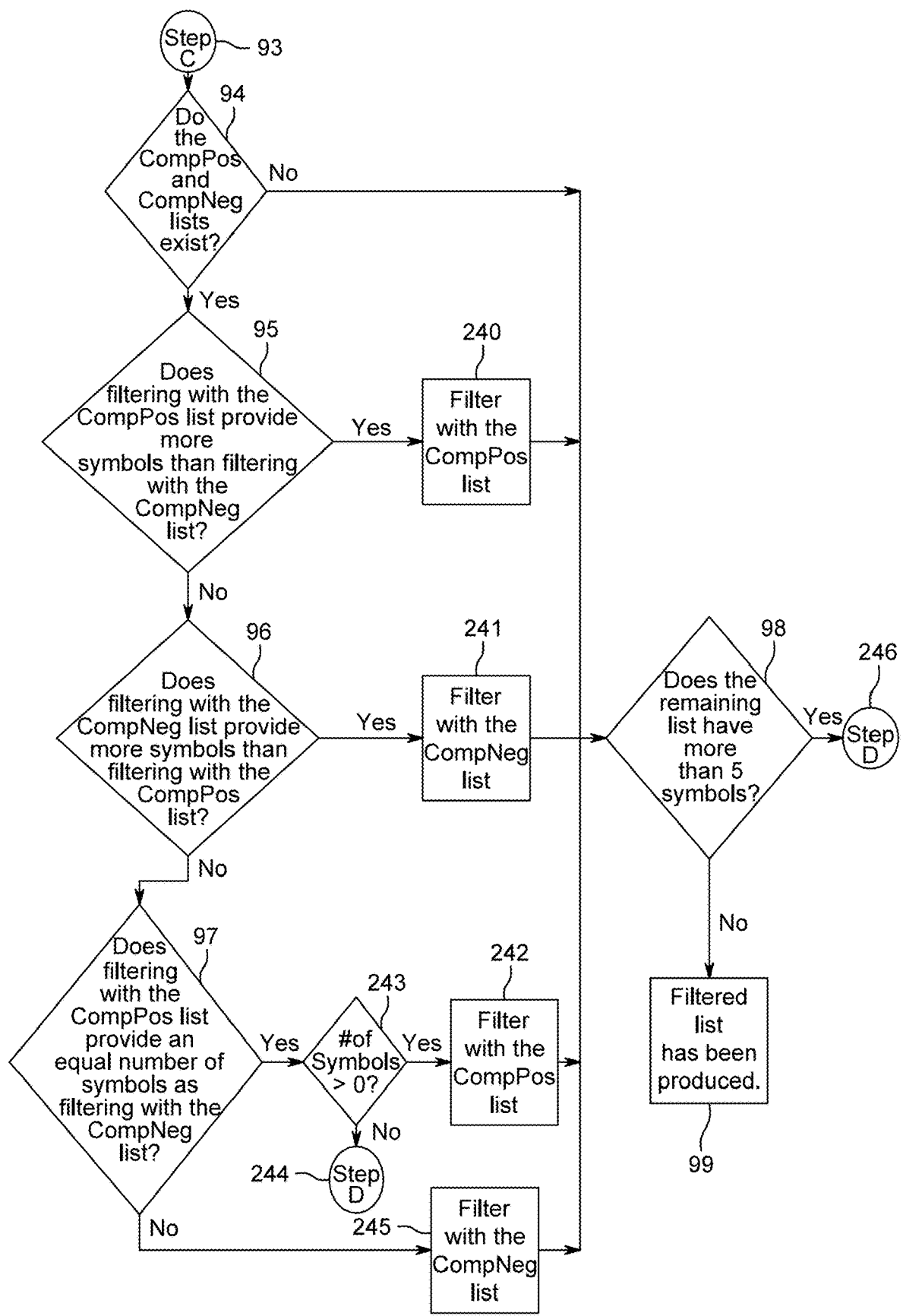

As shown in FIG. 2F, a method for additional filtering of stock symbols is illustrated, according to some embodiments of the present disclosure. The method begins at block 93, where Step C is entered from the preceding filtering process (e.g., from FIG. 2E). At block 94, it is determined whether both the CompPos list and the CompNeg list exist. If neither list exists, the method proceeds directly to block 98, discussed further below. If both lists exist, the method proceeds to block 95, where it is determined whether filtering with the CompPos list results in more symbols than filtering with the CompNeg list. If so, the method proceeds to block 240, where filtering is performed using the CompPos list. If filtering with the CompPos list does not produce more symbols, the method advances to block 96, where it is determined whether filtering with the CompNeg list provides more symbols than filtering with the CompPos list. If so, the method proceeds to block 241, where filtering is performed using the CompNeg list. If neither the CompPos list nor the CompNeg list provides more symbols, the method advances to block 97, where it is determined whether filtering with the CompPos list and the CompNeg list results in an equal number of symbols. If not, filtering is performed with the CompNeg list at block 245.

If the number of symbols produced by both the CompPos and CompNeg lists is equal, the method proceeds to block 243, where the number of filtered symbols is evaluated. At block 243, it is determined whether the number of filtered symbols exceeds five (5). If the number is greater than five, filtering is performed with the CompPos list at block 242. If the number is five or fewer, the method proceeds to block 244, where Step D is entered for additional filtering. After any of the filtering operations, the method proceeds to block 98, where it is determined whether the resulting filtered list still has more than five (5) symbols. If the list contains more than five symbols, the method loops to Step D at block 246. If the list contains five or fewer symbols, the method proceeds to block 99, where the final filtered list is produced. Thus, FIG. 2F illustrates a continuation of the iterative, comparative filtering process using the CompPos and CompNeg supplemental lists to ensure that the final list of stock symbols is reduced to no more than five (5) symbols for targeted trading analysis.

Figure 2G:
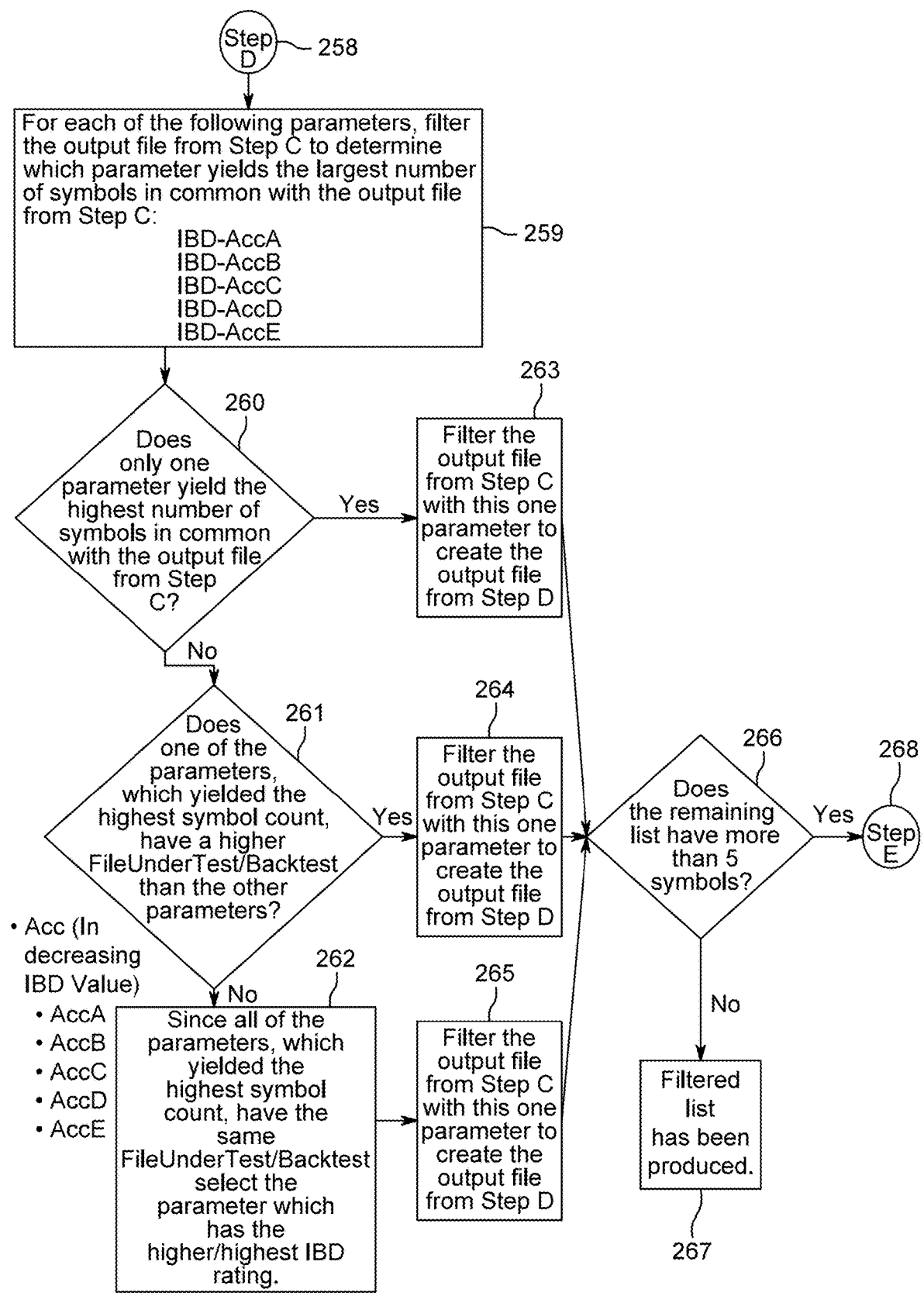

As shown in FIG. 2G, a method for further refining a filtered list of stock symbols using backtesting and ratings criteria is illustrated, according to some embodiments of the present disclosure. The method begins at block 258, where Step D is entered from the preceding filtering process (e.g., from FIG. 2F). At block 259, the method includes filtering the output file from Step C based on a set of parameters to determine which parameter yields the largest number of symbols in common with the output file from Step C. The parameters may include: IBD-AccA, IBD-AccB, IBD-AccC, IBD-AccD, and IBD-AccE. At block 260, it is determined whether only one of the parameters yields the highest number of symbols in common with the output file from Step C. If so, the method proceeds to block 263, where the output file from Step C is filtered using this one parameter to create the output file for Step D. If more than one parameter yields the highest symbol count, the method proceeds to block 261, where it is determined whether any one of the parameters that produced the highest symbol count has a higher FileUnderTest backtest score than the others. If one parameter does have a higher backtest score, the method proceeds to block 264, where the output file from Step C is filtered with that parameter to create the output file for Step D.

If no parameter has a higher backtest score than the others, the method proceeds to block 262, where the parameter with the highest IBD rating (in decreasing order AccA, AccB, AccC, AccD, AccE) is selected to perform the filtering. At block 263, block 264 and block 265, filtering is performed using the selected parameter to create the output file for Step D. After filtering, the method proceeds to block 266, where it is determined whether the resulting list has more than five (5) symbols. If the list still has more than five symbols, the method proceeds to Step E, at block 268 for further processing. If the list contains five or fewer symbols, the method proceeds to block 267, where the final filtered list is produced. Thus, FIG. 2G illustrates a multi-criteria decision-making process that uses symbol overlap, backtesting performance, and IBD rating to select the optimal filtering parameter, thereby ensuring production of a highly refined list of stock symbols for further trading analysis.

Figure 2H:
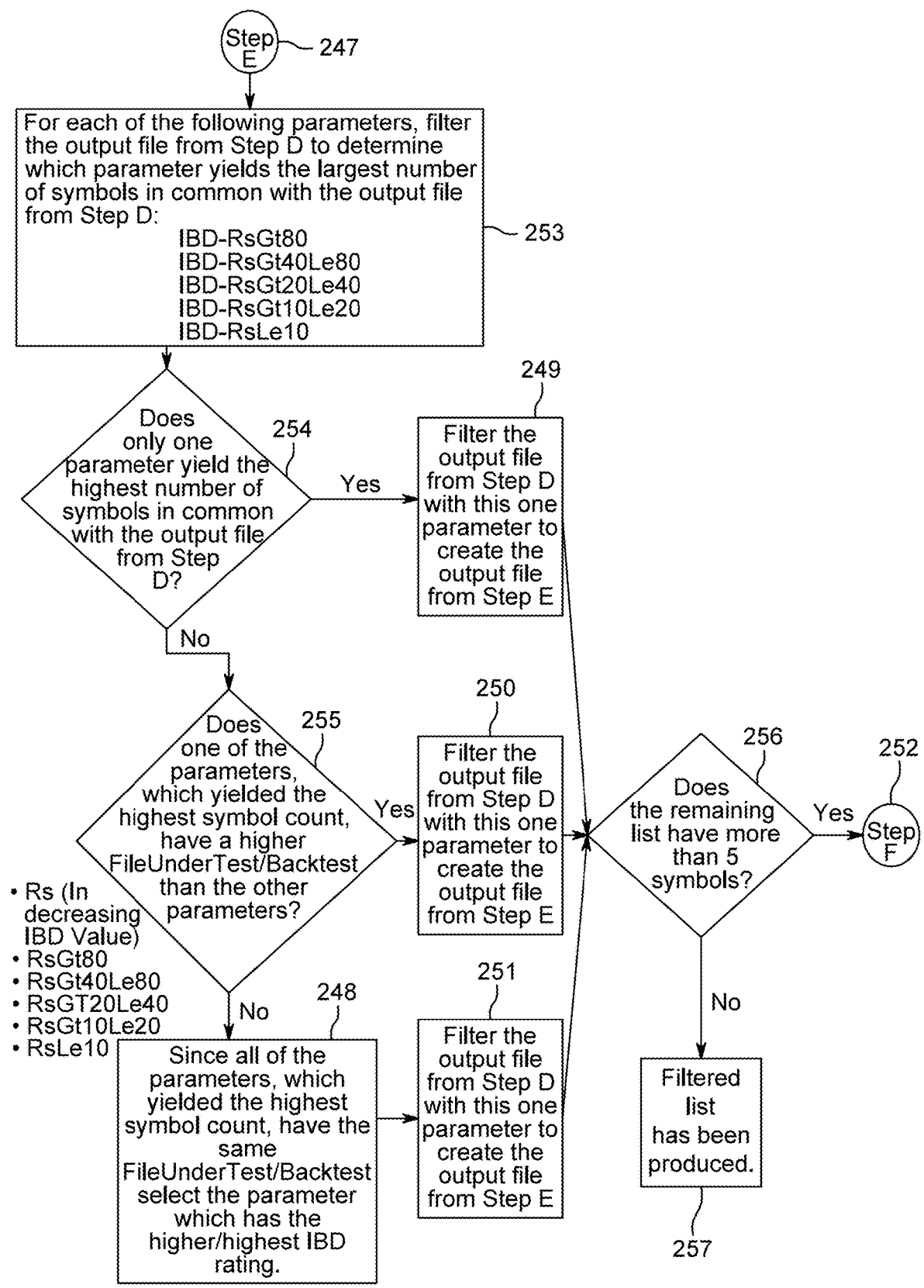
Figure 21:
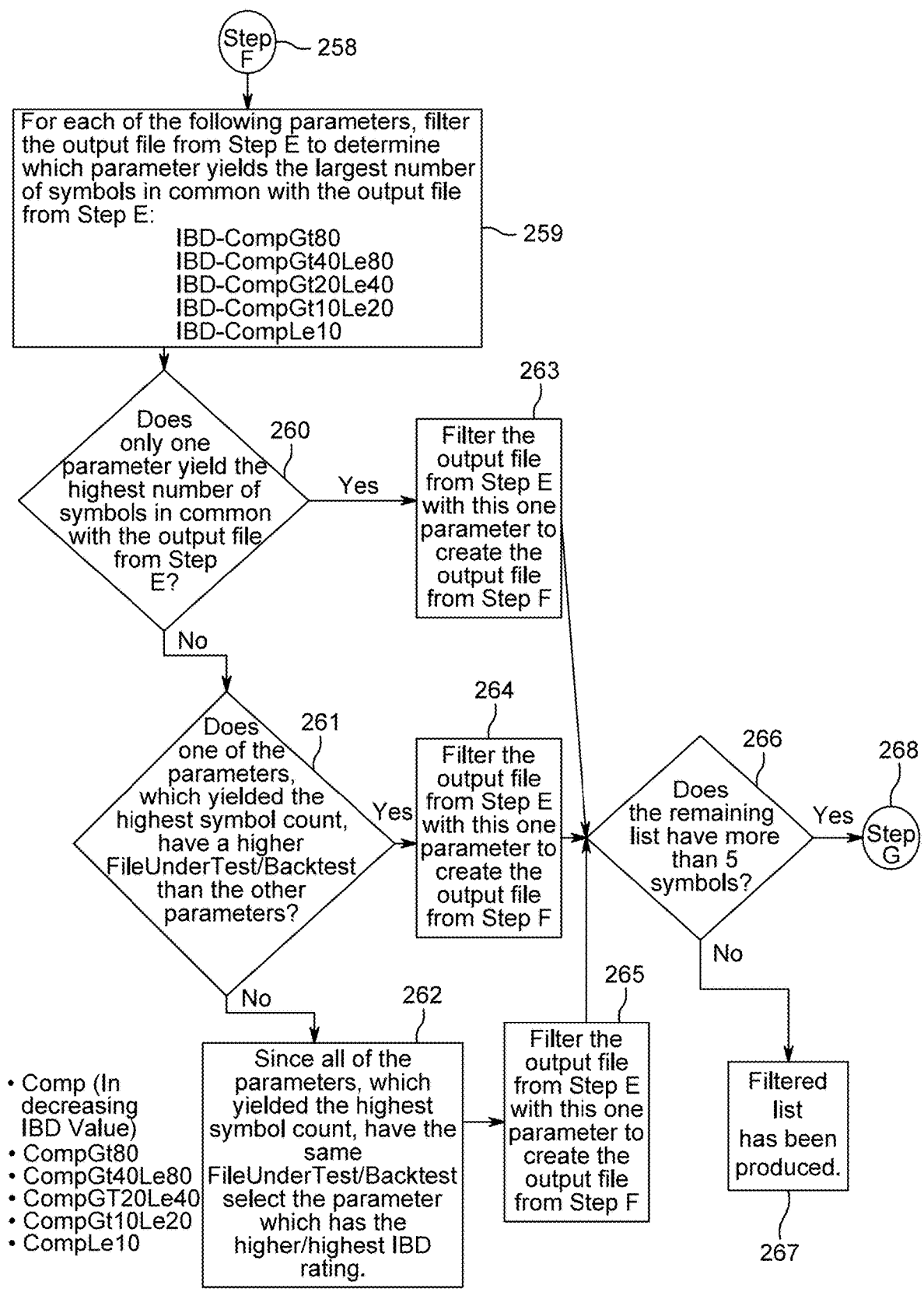

As shown in FIG. 2H, a method for further refining a filtered list of stock symbols using ranking parameters is illustrated, according to some embodiments of the present disclosure. The method begins at block 247, where Step E is entered from the preceding filtering process (e.g., from FIG. 2G). At block 253, the method includes filtering the output file from Step D for each of a plurality of parameters to determine which parameter yields the largest number of symbols in common with the output file from Step D. The evaluated parameters may include: IBD-RsG80, IBD-RsG40toL80, IBD-RsG20toL40, IBD-RsG10toL20, and IBD-RsLe10.

At block 254, it is determined whether only one parameter yields the highest number of symbols in common with the output file from Step D. If only one parameter yields the highest number, the method proceeds to block 249, where the output file from Step D is filtered using that parameter to create a new output file for Step E. If multiple parameters yield the same highest number of matching symbols, the method proceeds to block 255, where it is determined whether any of the parameters has a higher FileUnderTest backtest score compared to the others. If so, the method proceeds to block 250, where the output file from Step D is filtered using that parameter to create the output file for Step E. If none of the parameters has a higher backtest score, the method proceeds to block 248, where the parameter having the highest IBD ranking (in decreasing order: RsG80, RsG40toL80, RsG20toL40, RsG10toL20, RsLe10) is selected for filtering.

Following parameter selection, the method proceeds to either block 249, block 250, or block 251, where the output file from Step D is filtered using the selected parameter to generate the output file for Step E. After filtering, the method proceeds to block 256, where it is determined whether the resulting list still contains more than five (5) symbols. If more than five symbols remain, the method moves to Step F at block 252 for further refinement. If the list contains five or fewer symbols, the method proceeds to block 257, where the final filtered list is produced. Thus, FIG. 2H illustrates a systematic decision-making process for selecting an optimal parameter based on symbol overlap, backtest performance, and IBD ranking in order to generate a final refined stock symbol list for trading analysis.

As shown in FIG. 2I, a method for refining a filtered list of stock symbols based on comparative ranking parameters is illustrated, according to some embodiments of the present disclosure. The method begins at block 258, where Step F is entered from the preceding filtering process (e.g., from FIG. 2H). At block 259, the method includes filtering the output file from Step E based on several parameters to determine which parameter yields the largest number of symbols in common with the output file from Step E. The evaluated parameters may include: IBD-CompG80, IBD-CompG40toL80, IBD-CompG20toL40, IBD-CompG10toL20, and IBD-CompLe10. At block 260, it is determined whether only one parameter yields the highest number of symbols in common with the output file from Step E. If only one parameter yields the highest number, the method proceeds to block 263, where the output file from Step E is filtered using this one parameter to create the output file for Step F. If multiple parameters yield the same highest number of matching symbols, the method proceeds to block 261, where it is determined whether any one of these parameters has a higher FileUnderTest backtest score compared to the others. If one parameter does have a higher backtest score, the method proceeds to block 264, where the output file from Step E is filtered using that parameter to create the output file for Step F.

If none of the parameters has a higher backtest score, the method proceeds to block 262, where the parameter with the higher IBD rating (in decreasing order: CompG80, CompG40toL80, CompG20toL40, CompG10toL20, CompLe10) is selected. Following selection of the appropriate filtering parameter, the method proceeds to either block 263, block 264, or block 265, where the output file from Step E is filtered to produce the updated output file for Step F. After filtering, the method proceeds to block 266, where it is determined whether the resulting list contains more than five (5) symbols. If more than five symbols remain, the method moves to Step G at block 268 for further refinement. If the list contains five or fewer symbols, the method proceeds to block 267, where the final filtered list is produced. Thus, FIG. 2I illustrates a structured filtering method based on symbol overlap, backtesting performance, and comparative ranking values to systematically generate a highly refined stock list for use in targeted trading strategies.

Figure 2J:
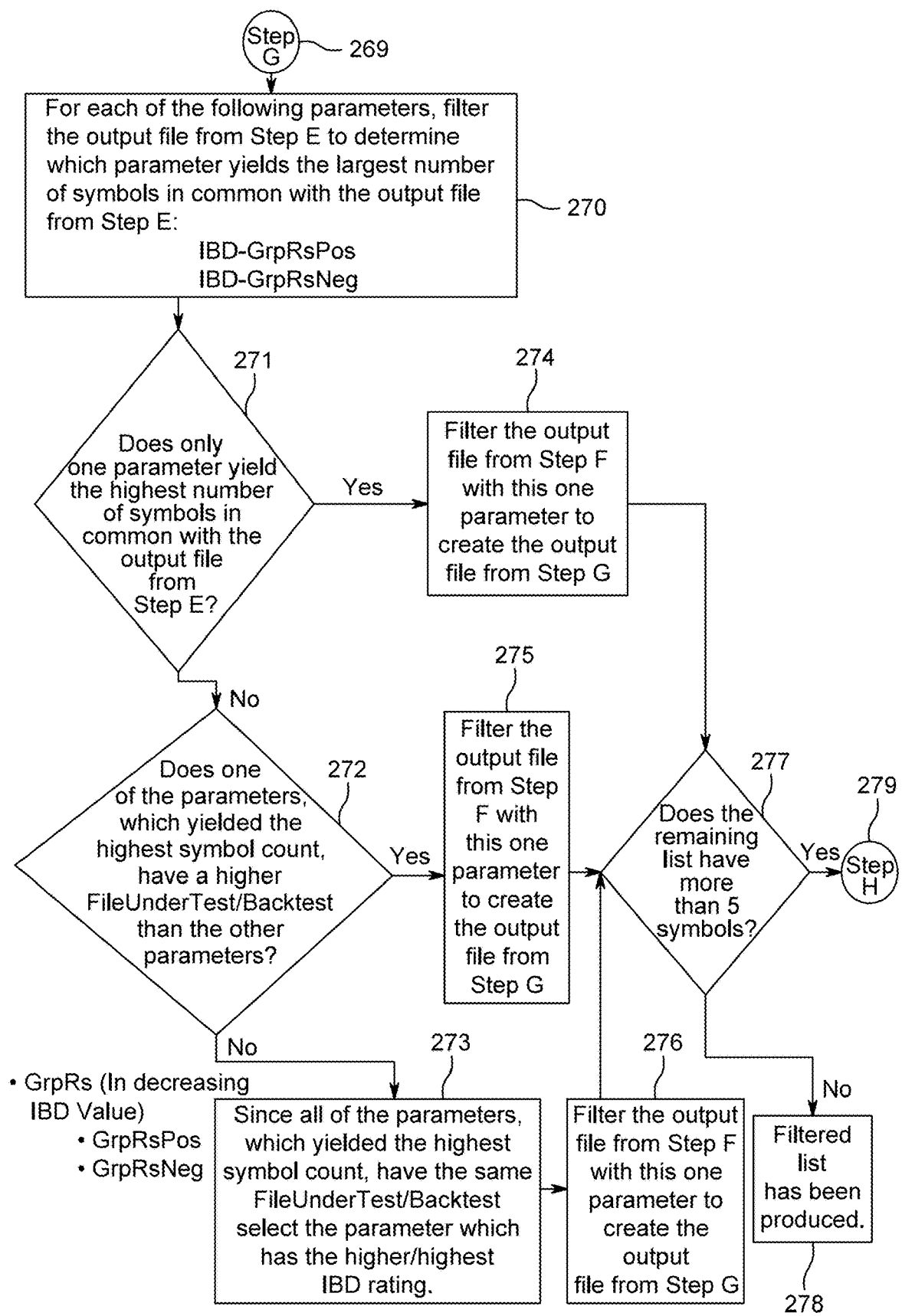

As shown in FIG. 2J, a method for refining a filtered list of stock symbols based on group ranking parameters is illustrated, according to some embodiments of the present disclosure. The method begins at block 269, where Step G is entered from the preceding filtering process (e.g., from FIG. 2I). At block 270, the method includes filtering the output file from Step F for each of a plurality of parameters to determine which parameter yields the largest number of symbols in common with the output file from Step F. The evaluated parameters may include: IBD-GrpRsPos and IBD-GrpRsNeg.

At block 271, it is determined whether only one parameter yields the highest number of symbols in common with the output file from Step F. If only one parameter yields the highest number, the method proceeds to block 274, where the output file from Step F is filtered using this one parameter to create the output file for Step G. If multiple parameters yield the same highest number of matching symbols, the method proceeds to block 272, where it is determined whether any one of the parameters has a higher FileUnderTest backtest score compared to the others. If one parameter has a higher backtest score, the method proceeds to block 275, where the output file from Step F is filtered using that parameter to create the output file for Step G. If none of the parameters has a higher backtest score, the method proceeds to block 273, where the parameter with the higher IBD rating (in decreasing order: GrpRsPos, GrpRsNeg) is selected.

Following parameter selection, the method proceeds to either block 274, block 275, or block 276, where the output file from Step F is filtered using the selected parameter to produce the updated output file for Step G. After filtering, the method proceeds to block 277, where it is determined whether the resulting filtered list contains more than five (5) symbols. If more than five symbols remain, the method moves to Step H, at block 279 for further refinement. If the list contains five or fewer symbols, the method proceeds to block 278, where the final filtered list is produced. Thus, FIG. 2J illustrates a final-stage selection process using group relative strength parameters, backtesting performance, and ranking to produce a refined stock symbol list optimized for trading.

Figure 2K:
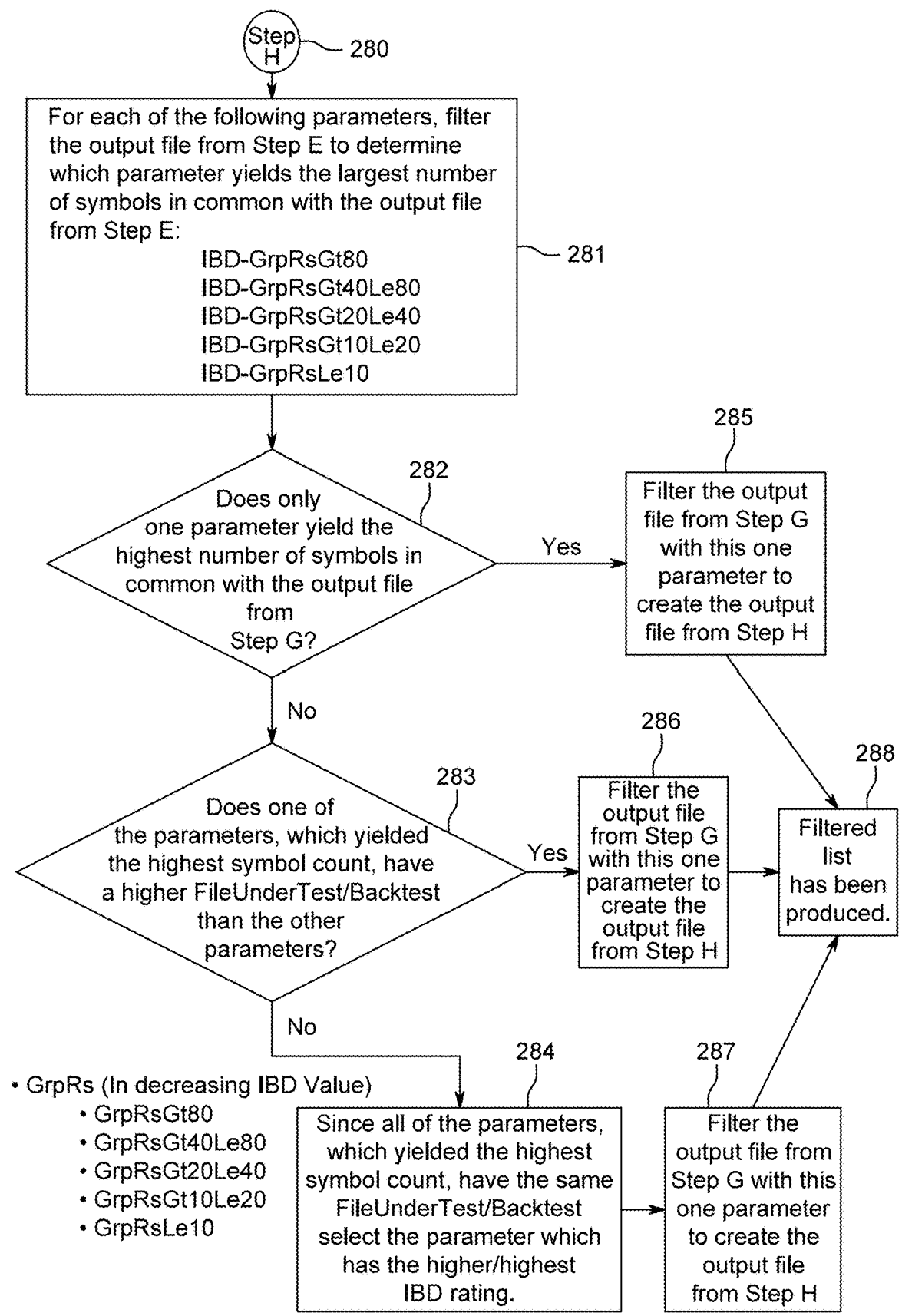

FIG. 2K illustrates a method for final refinement of a filtered list of stock symbols based on group relative strength parameters is illustrated, according to some embodiments of the present disclosure. The method begins at block 280, where Step H is entered from the preceding filtering process (e.g., from FIG. 2J). At block 281, the method includes filtering the output file from Step G based on several parameters to determine which parameter yields the largest number of symbols in common with the output file from Step G. The evaluated parameters may include: IBD-GrpRsG80, IBD-GrpRsG40toL80, IBD-GrpRsG20toL40, IBD-GrpRsG10toL20, and IBD-GrpRsLe10. At block 282, it is determined whether only one parameter yields the highest number of symbols in common with the output file from Step G. If only one parameter yields the highest number, the method proceeds to block 285, where the output file from Step G is filtered using this one parameter to create the output file for Step H.

If multiple parameters yield the same highest number of matching symbols, the method proceeds to block 283, where it is determined whether any one of the parameters that yielded the highest symbol count has a higher FileUnderTest backtest score compared to the others. If one parameter has a higher backtest score, the method proceeds to block 286, where the output file from Step G is filtered using that parameter to generate the output file for Step H. If none of the parameters has a higher backtest score, the method proceeds to block 284, where the parameter with the highest IBD ranking (in decreasing order: GrpRsG80, GrpRsG40toL80, GrpRsG20toL40, GrpRsG10toL20, GrpRsLe10) is selected. Following parameter selection, the method proceeds to either block 285, block 286, or block 287, where the output file from Step G is filtered using the selected parameter to produce the updated output file for Step H. The method proceeds to block 288, where the final filtered list is produced based on the selected filtering operation. Thus, FIG. 2K illustrates the final decision-making stage for producing a highly refined and trading-ready stock symbol list based on group relative strength analysis, backtest validation, and hierarchical ranking criteria.

Figure 2L:
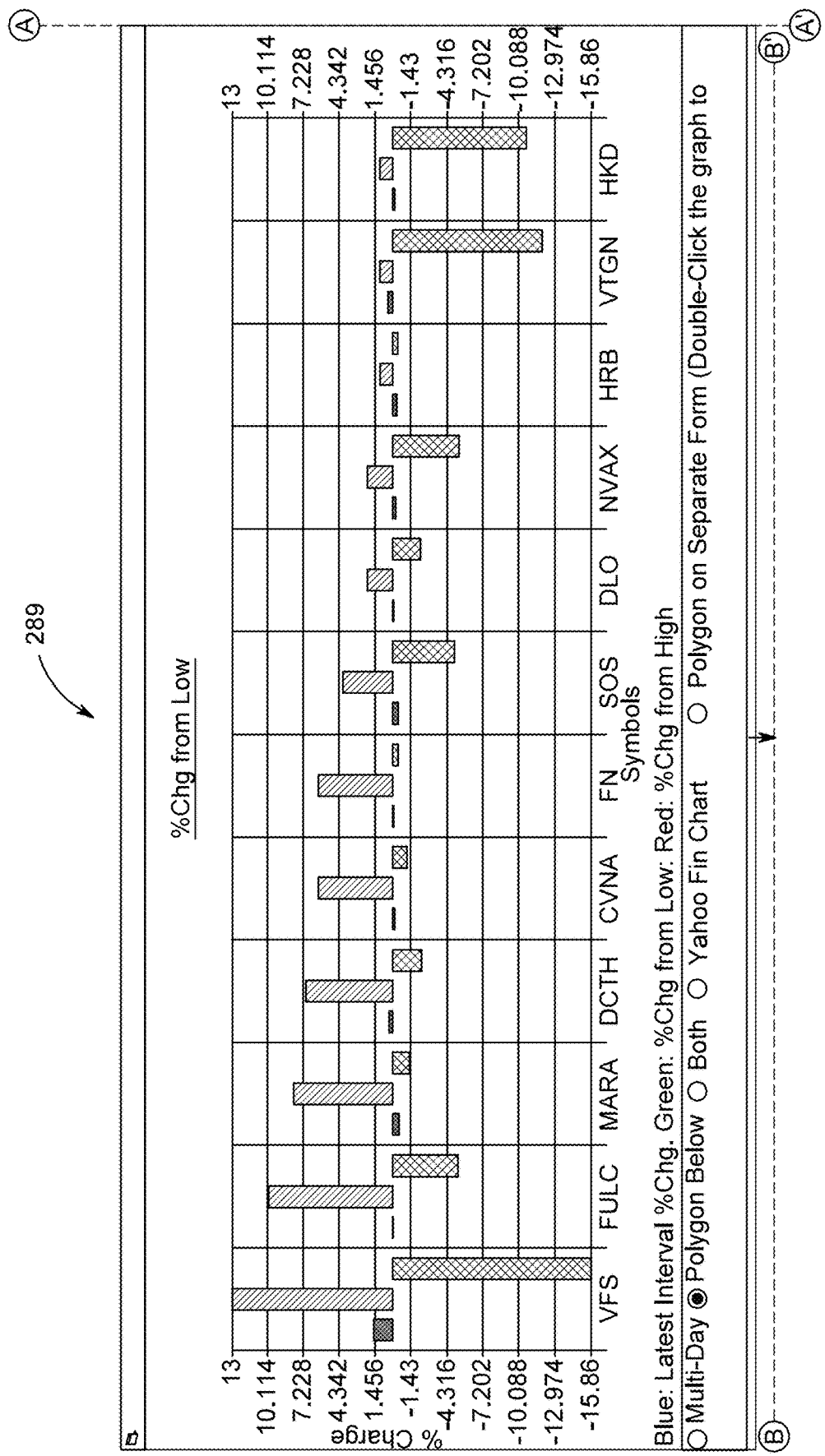
FIG. 2L depicts a display screen for stock monitoring, tracking, and filtering, in accordance with embodiments of the present invention.
Figure 2L:
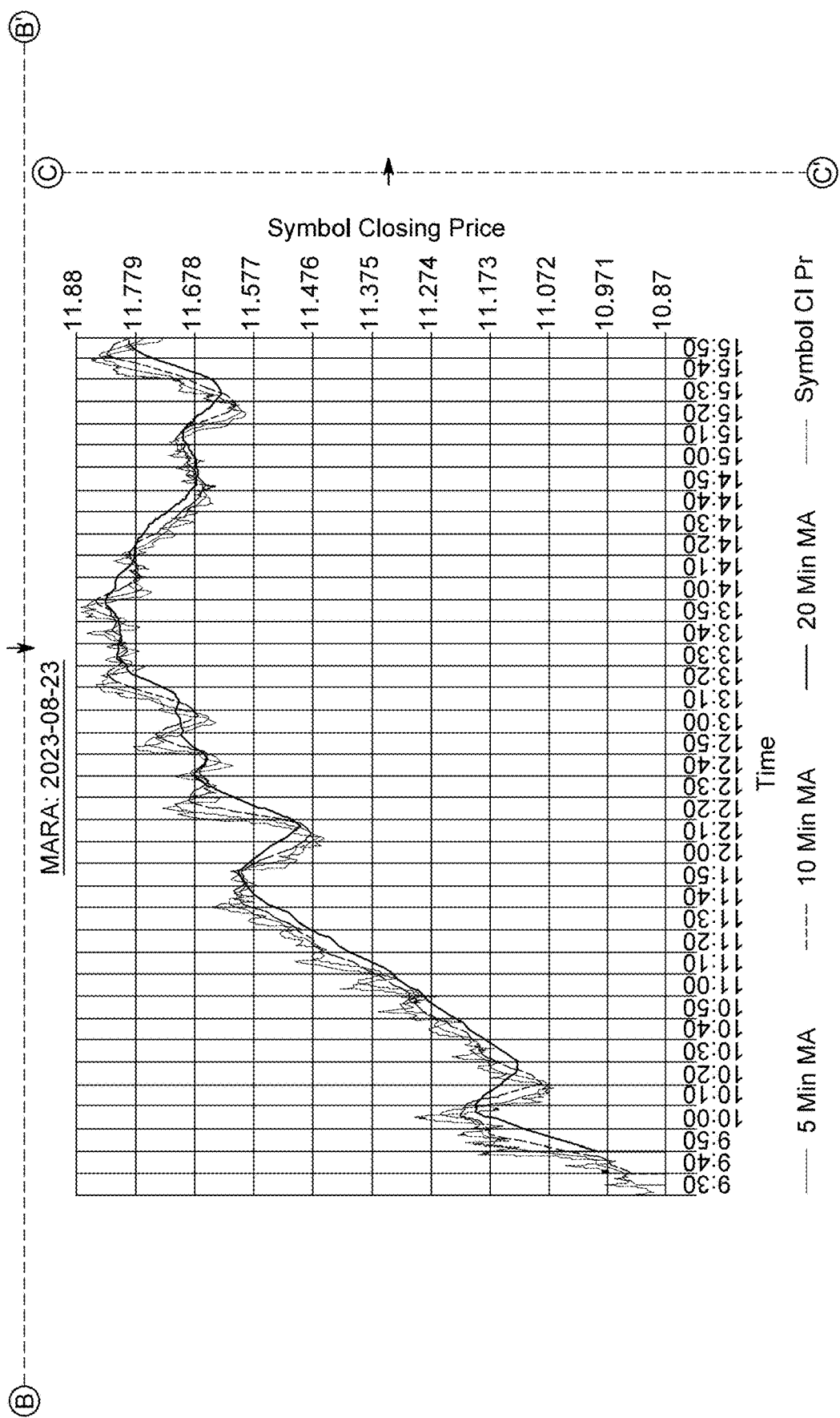
Figure 2L:
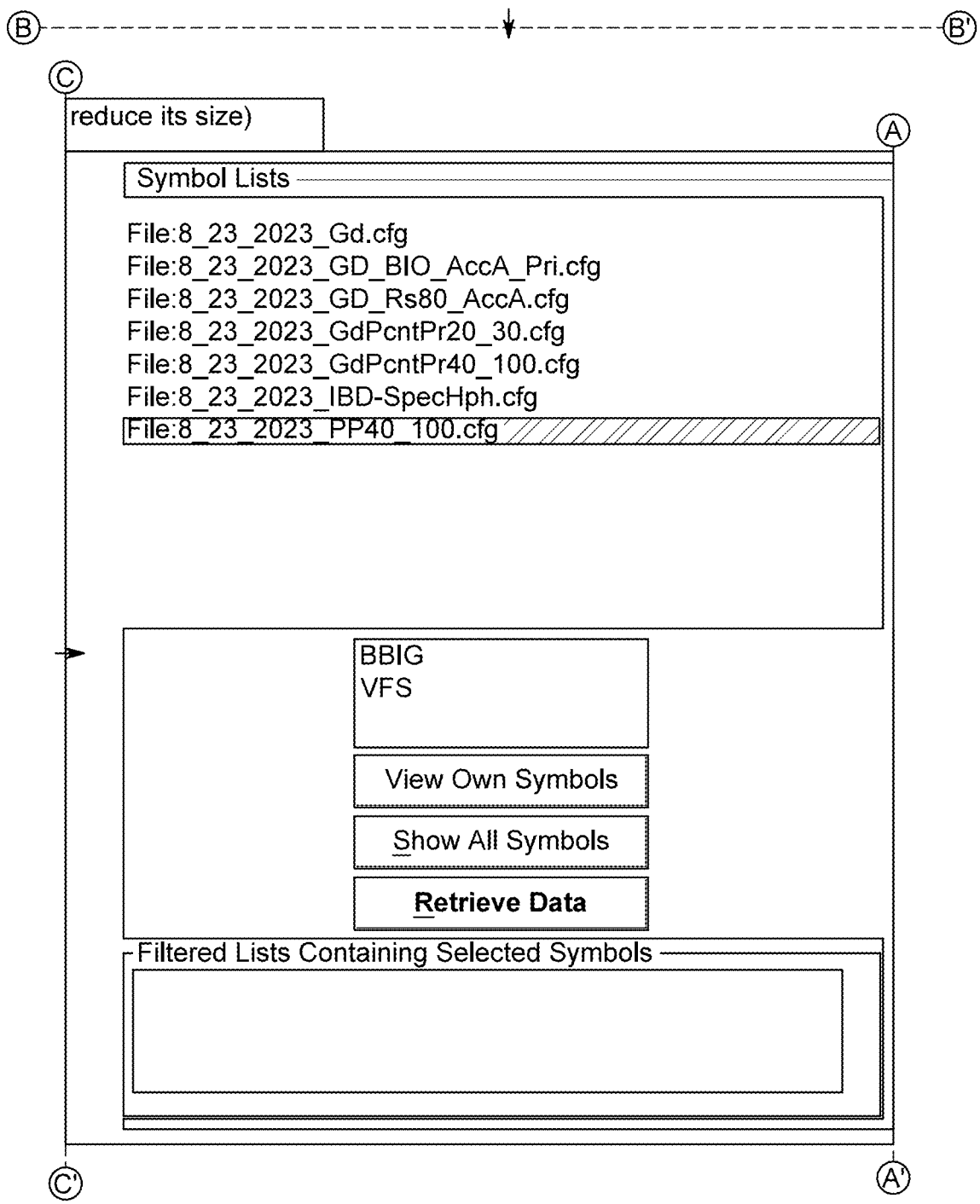
Figure 2L:
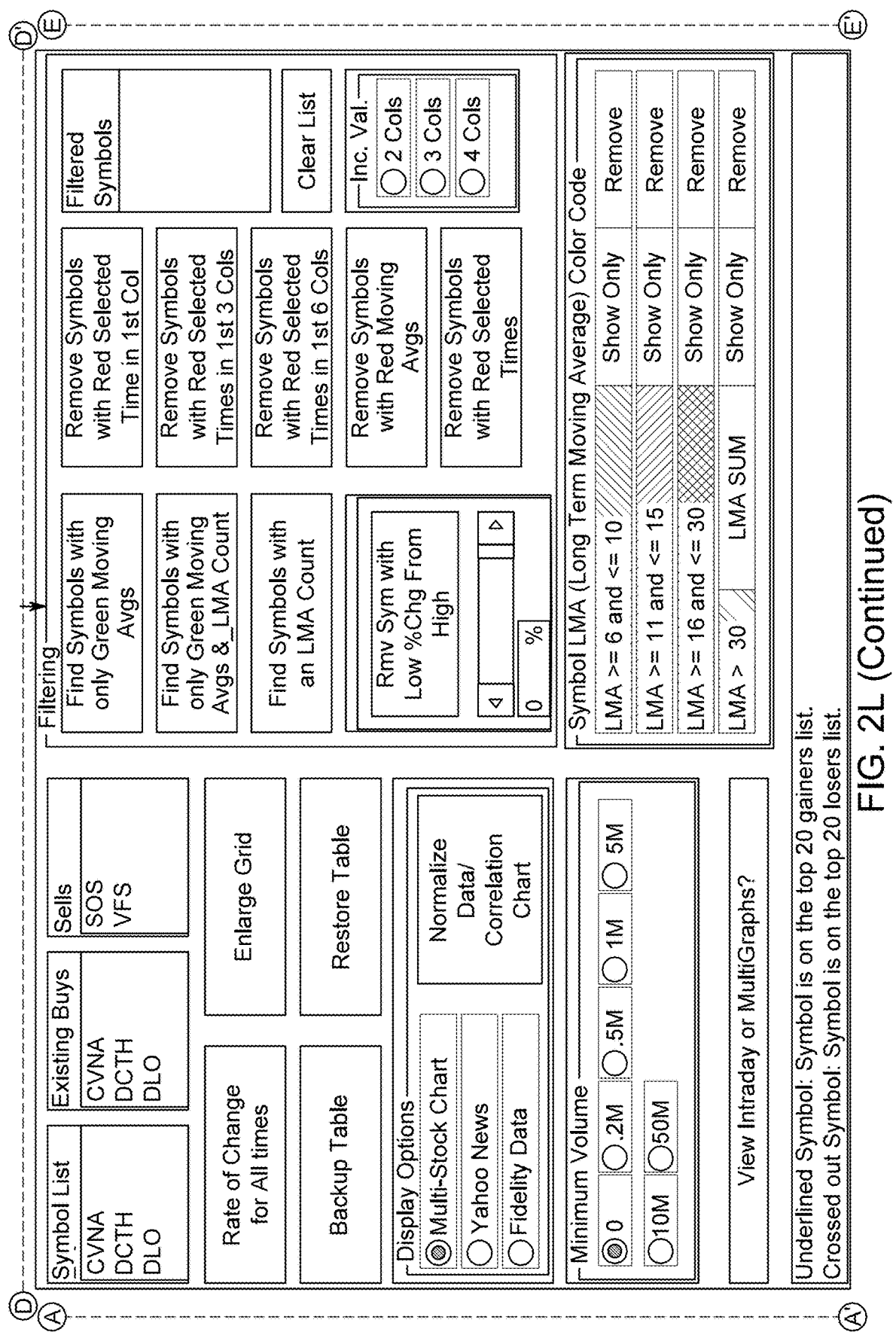

As shown in FIG. 2L, a display screen 289 for stock monitoring, tracking, and filtering is illustrated, according to some embodiments of the present disclosure. At block 289, the display screen may include a variety of visual components for presenting real-time and historical stock data. In some embodiments, the display screen may feature a primary chart area for visualizing stock performance over time, such as daily or intraday percentage changes. The display may include an area for presenting moving averages, price thresholds, and relative strength comparisons for selected stocks.

In some embodiments, the display screen 289 may also provide an interactive selection menu where users can filter stocks based on pre-established criteria such as trading volume, percentage change from low, or IBD (Investor's Business Daily) performance rankings. The display may include dedicated areas for user input fields, graphical sliders, and clickable options that allow dynamic updating of the filtered stock lists. In some embodiments, the display screen 289 may further include visual indicators showing the status of different filtering stages, such as whether a stock has passed the primary, secondary, or tertiary filtering levels. A portfolio tracking area may be presented alongside graphical plots to track selected stocks against various technical indicators, benchmarks, or historical performance curves. The display may also incorporate calendar elements for selecting specific trading days and retrieving corresponding stock data, as well as summary panels listing key metrics such as high price, low price, close price, trading volume, and computed percentage changes. Thus, FIG. 2L illustrates an integrated stock monitoring and filtering interface that enables users to visualize, track, and dynamically refine lists of stocks based on a combination of real-time performance data and predefined screening parameters.

Figure 4:
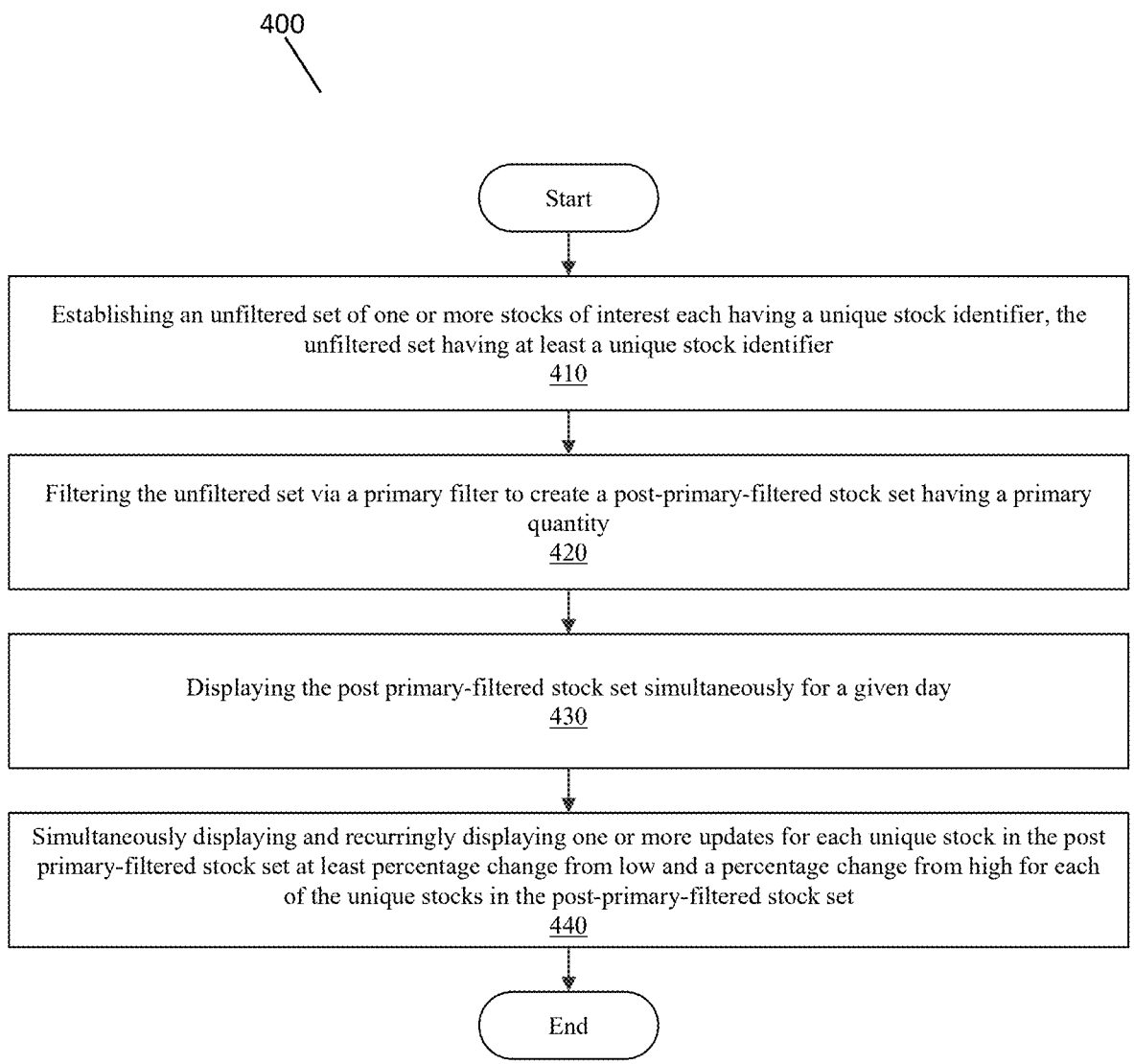
FIG. 4 is a flowchart illustrating a method for targeted stock monitoring and trading, according to some embodiments of the present disclosure.

FIG. 4 is a flowchart 400 illustrates a method for targeted stock monitoring and trading, according to some embodiments of the present disclosure. At block 410, the method may include establishing an unfiltered set of one or more stocks of interest, wherein each stock has a unique stock identifier. The unfiltered set includes at least one unique stock identifier and may include a greater number of stocks depending on predefined criteria or lists such as daily market watchlists or sector-specific groups. At block 420, the method may include filtering the unfiltered set via a primary filter to create a post-primary-filtered stock set having a primary quantity. In some embodiments, the primary filter may be based on performance criteria such as average close-to-low percentage changes, moving averages, or trading volume thresholds. The primary quantity may limit the number of stocks retained in the post-primary-filtered stock set, for example to a maximum of five (5) symbols for further tracking.

At block 430, the method may include displaying the post-primary-filtered stock set simultaneously for a given day. In some embodiments, the displayed list provides users with a refined, focused selection of stocks that meet the primary filtering criteria, enabling efficient monitoring. At block 440, the method may include simultaneously displaying and recurringly updating one or more performance metrics for each unique stock in the post-primary-filtered stock set. The updates may include at least a percentage change from the low and a percentage change from the high for each unique stock. In some embodiments, these updates are retrieved from real-time or near real-time data feeds and are continuously refreshed throughout the trading session. Thus, FIG. 4 provides a structured method for establishing, filtering, and dynamically monitoring a refined list of stocks based on unique identifiers and performance-based filtering criteria, enabling targeted stock tracking and trading activities.

Figure 5:
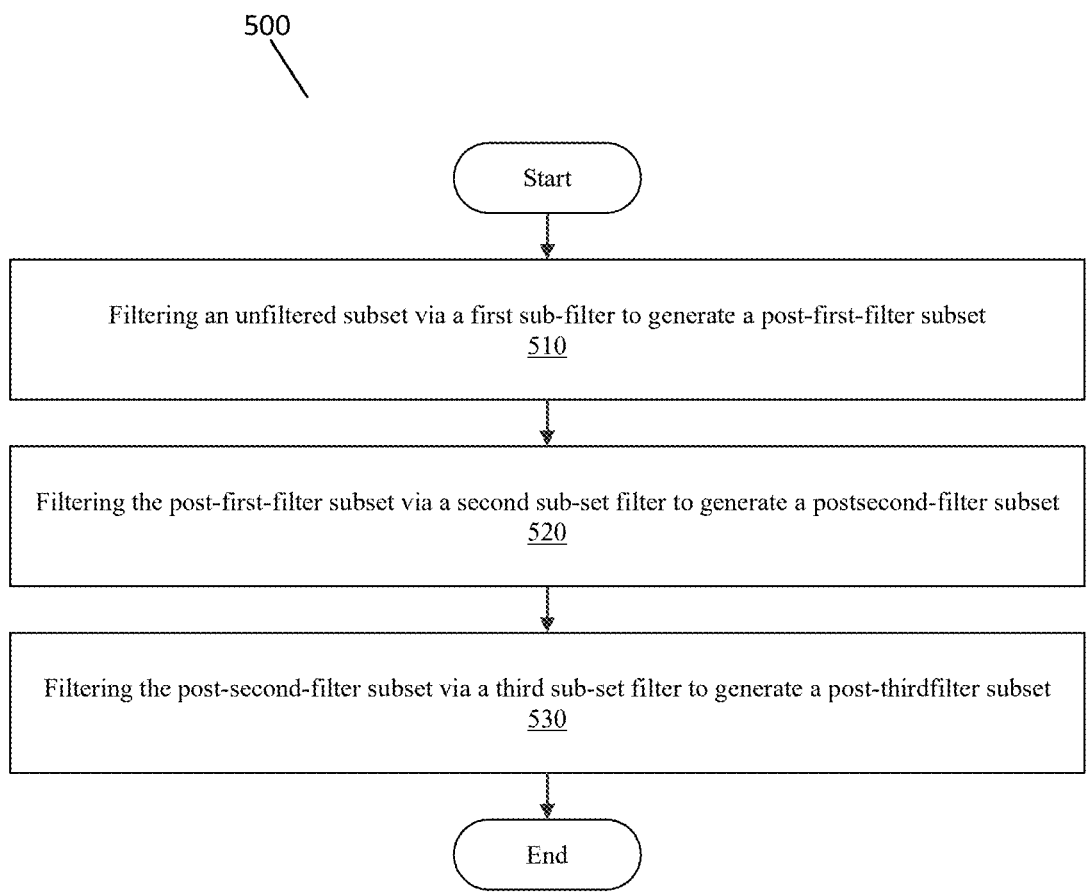
FIG. 5 is a flowchart further illustrating the method for targeted stock monitoring and trading from FIG. 4, according to some embodiments of the present disclosure.

As shown in FIG. 5, a flowchart 500 further illustrates the method for targeted stock monitoring and trading from FIG. 4, according to some embodiments of the present disclosure. At block 510, the method may include filtering an unfiltered subset of stocks via a first sub-filter to generate a post-first-filter subset. In some embodiments, the first sub-filter may apply trading volume thresholds, minimum price change requirements, or other primary screening criteria designed to reduce the number of candidate stocks based on initial performance parameters. At block 520, the method may include filtering the post-first-filter subset via a second sub-filter to generate a post-second-filter subset. In some embodiments, the second sub-filter may incorporate additional or secondary performance metrics, such as relative strength indicators, earnings momentum, volatility measurements, or comparative rankings, to further narrow the selection of stocks. At block 530, the method may include filtering the post-second-filter subset via a third sub-filter to generate a post-third-filter subset. In some embodiments, the third sub-filter may apply tertiary selection criteria, including custom rank orders, historical consistency metrics, or specific intersectional lists derived from external ranking systems such as IBD (Investor's Business Daily). Thus, FIG.

5 illustrates a multi-stage, hierarchical filtering approach that progressively refines an initial unfiltered set of stocks into a smaller, highly-targeted list suitable for active monitoring, display, and potential trading, as discussed with respect to FIG. 4.

Figure 6:
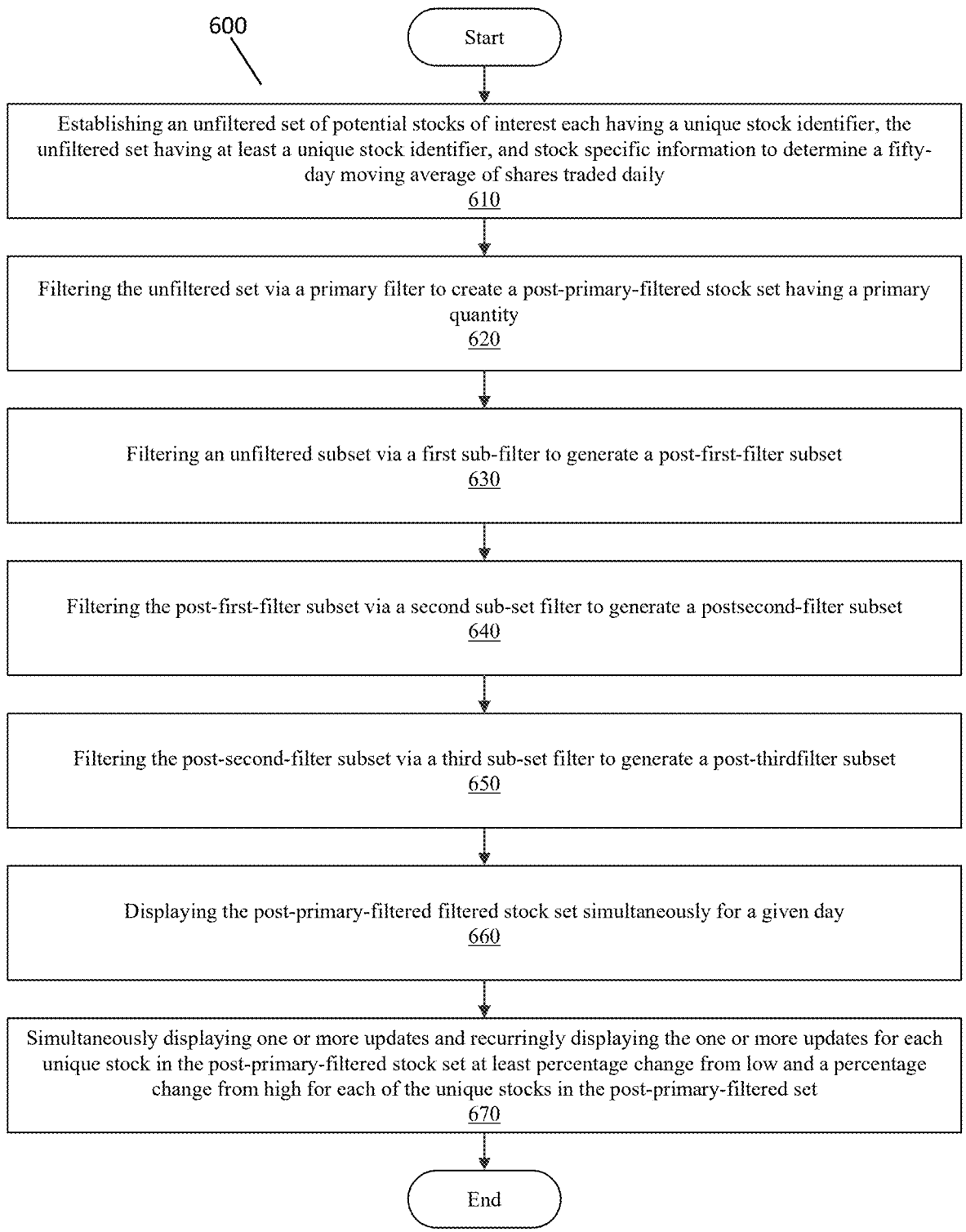
FIG. 6 is a flowchart illustrating a method for targeted stock monitoring and trading, according to some embodiments of the present disclosure.

As shown in FIG. 6, a flowchart 600 illustrates a method for targeted stock monitoring and trading, according to some embodiments of the present disclosure. At block 610, the method may include establishing an unfiltered set of potential stocks of interest, where each stock has a unique stock identifier. The unfiltered set may include at least one unique stock identifier, along with stock-specific information such as trading volume, high price, low price, and closing price. In some embodiments, the stock-specific information may be utilized to determine a fifty-day moving average of shares traded daily for each stock. At block 620, the method may include filtering the unfiltered set via a primary filter to generate a post-primary-filtered stock set having a primary quantity. The primary filter may apply performance-based metrics such as price volatility, average close-to-low percentage, or trading volume criteria.

At block 630, the method may include filtering an unfiltered subset via a first sub-filter to generate a post-first-filter subset. In some embodiments, the first sub-filter may target basic eligibility criteria, such as a minimum average daily trading volume threshold. At block 640, the method may include filtering the post-first-filter subset via a second sub-filter to generate a post-second-filter subset. The second sub-filter may apply additional refinement parameters such as technical indicators, performance over a fixed period, or sector-relative performance measures. At block 650, the method may include filtering the post-second-filter subset via a third sub-filter to generate a post-third-filter subset. In some embodiments, the third sub-filter may incorporate custom ranking or backtested scoring methodologies to further prioritize stocks within the subset.

Figure 7:
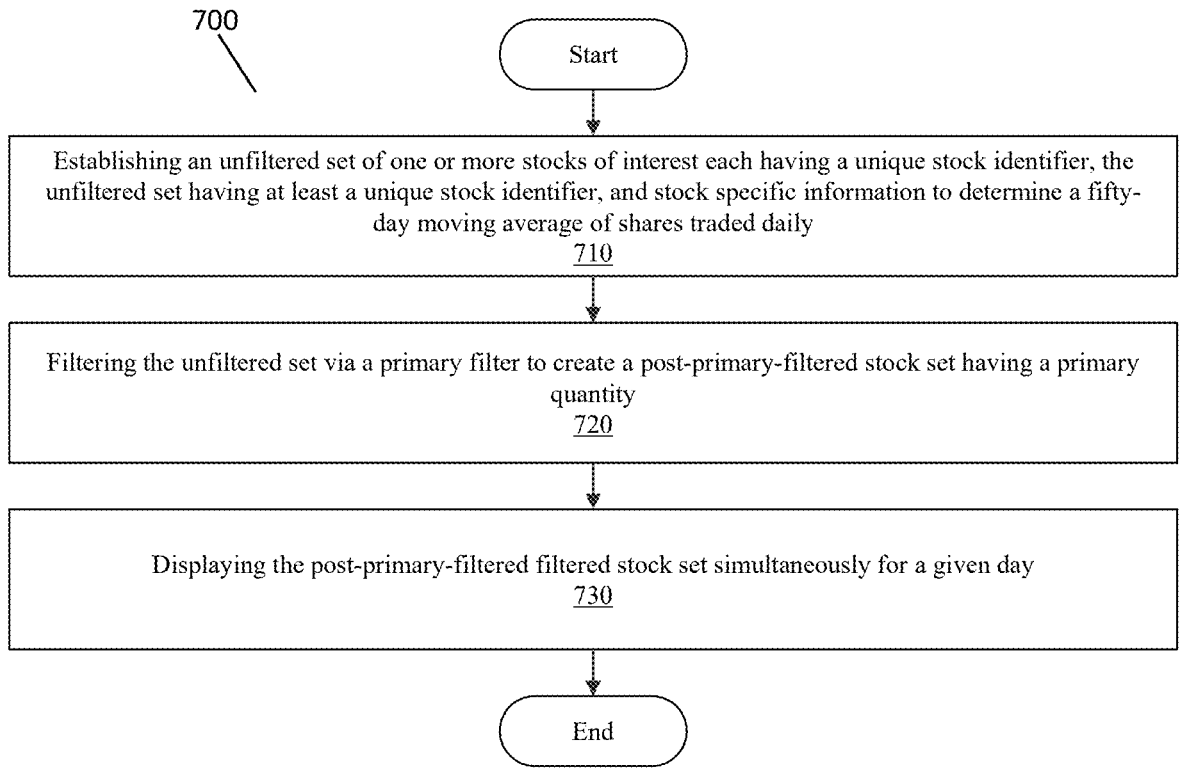
FIG. 7 is a flowchart illustrating a method for targeted stock monitoring and trading, according to some embodiments of the present disclosure.

At block 660, the method may include displaying the post-primary-filtered stock set simultaneously for a given day. The display may present stocks that have passed all levels of filtering and are suitable for real-time monitoring and analysis. At block 670, the method may include simultaneously displaying and recurringly updating one or more metrics for each unique stock in the post-primary-filtered stock set. The updates may include, at a minimum, a percentage change from the low and a percentage change from the high for each unique stock, enabling users to monitor intraday performance dynamically. Thus, FIG. 6 illustrates an enhanced, multi-stage method for selecting, refining, and actively monitoring a targeted stock list based on dynamic performance and volume-based criteria. As shown in FIG. 7, a flowchart 700 illustrates a method for targeted stock monitoring and trading, according to some embodiments of the present disclosure.

At block 710, the method may include establishing an unfiltered set of one or more stocks of interest, wherein each stock has a unique stock identifier. The unfiltered set includes at least a unique stock identifier and may also include stock-specific information sufficient to determine a fifty-day moving average of shares traded daily for each stock. In some embodiments, this unfiltered set may be generated from external stock market sources, watchlists, or dynamically updated databases. At block 720, the method may include filtering the unfiltered set via a primary filter to create a post-primary-filtered stock set having a primary quantity. The primary filter may select stocks that meet defined performance, volume, or volatility criteria, thus narrowing the initial unfiltered set to a smaller, more manageable group of stocks. At block 730, the method may include displaying the post-primary-filtered stock set simultaneously for a given day. In some embodiments, the display provides real-time or near real-time tracking of the stocks that have successfully passed the primary filtering process, allowing for focused monitoring and analysis. Thus, FIG. 7 illustrates a streamlined method for stock selection and presentation based on unique identifiers and trading activity parameters, supporting efficient real-time monitoring for trading or investment purposes.

Systems, Devices and Operating Systems

Figure 3:
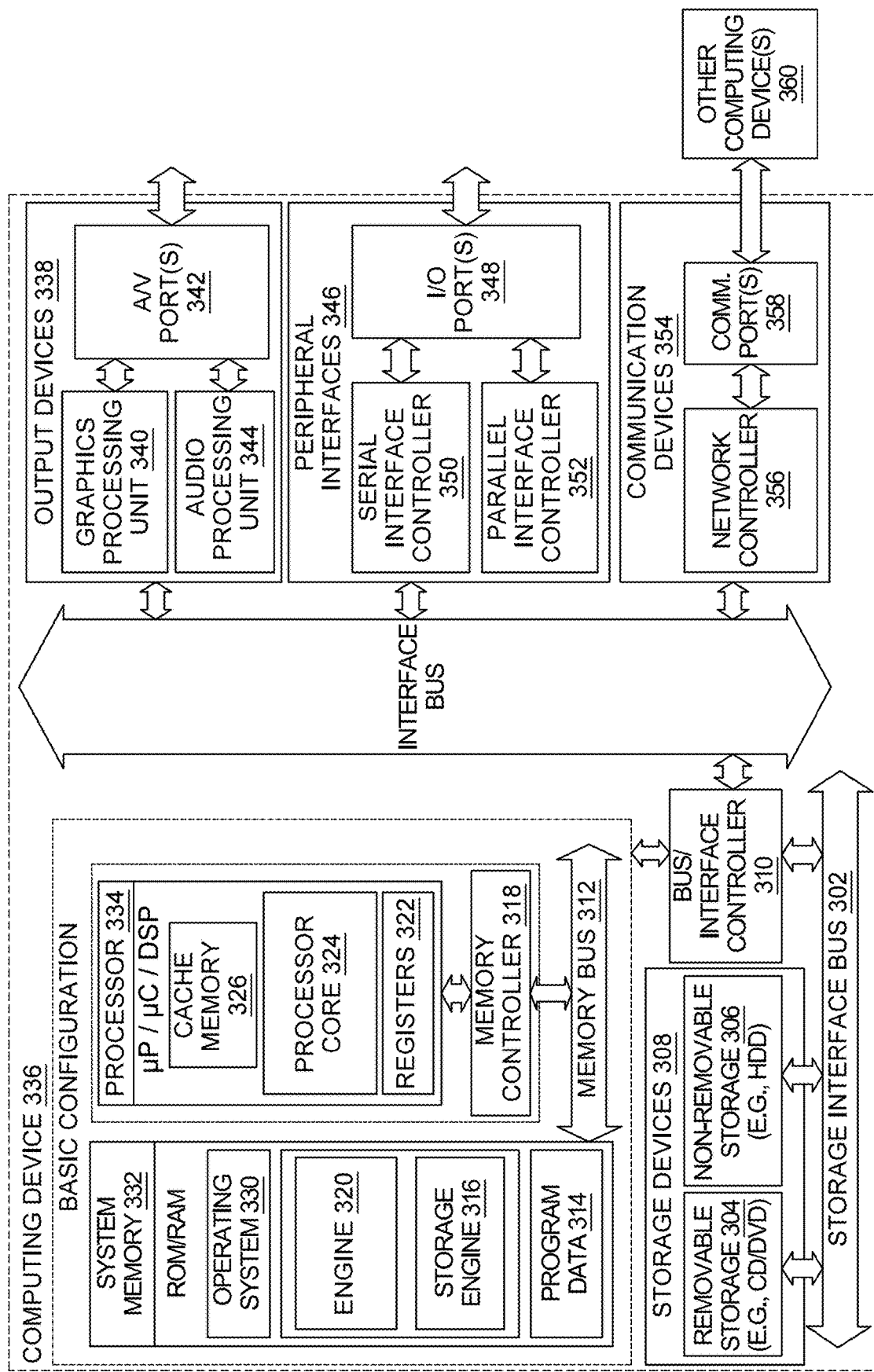
FIG. 3 depicts a block diagram of a set of computing devices referenced in FIG. 1A, in accordance with embodiments of the present invention.

A basic configuration of a computing device 336 (such as the first computing device 220, 222, 224, or 226 of FIG. 1A) is illustrated in FIG. 3 by those components within the inner dashed line. In the basic configuration of the computing device 336, the computing device 336 includes a processor 334 and a system memory 332. The terms "processor" and "central processing unit" or "CPU" are used interchangeably herein. In some examples, the computing device 336 may include one or more processors and the system memory 332. A memory bus 312 is used for communicating between the one or more processors 334 and the system memory 332.

Depending on the desired configuration, the processor 334 may be of any type, including, but not limited to, a microprocessor (μP), a microcontroller (μC), and a digital signal processor (DSP), or any combination thereof. In examples, the microprocessor may be AMD's ATHLON, DURON and/or OPTERON; ARM's application, embedded and secure processors; IBM and/or MOTOROLA's DRAGONBALL and POWERPC; IBM's and SONY's Cell processor; INTEL'S CELERON, CORE (2) DUO, ITANIUM, PENTIUM, XEON, and/or XSCALE; and/or the like processor(s).

Further, the processor 334 may include one more levels of caching, such as a level cache memory 326, a processor core 324, and registers 322, among other examples. The processor core 324 may include an arithmetic logic unit (ALU), a floating point unit (FPU), and/or a digital signal processing core (DSP Core), or any combination thereof. A memory controller 318 may be used with the processor 334, or, in some implementations, the memory controller 318 may be an internal part of the memory controller 318.

Depending on the desired configuration, the system memory 332 may be of any type, including, but not limited to, volatile memory (such as RAM), and/or non-volatile memory (such as ROM, flash memory, etc.), or any combination thereof. The system memory 332 includes an operating system 330, one or more engines, such as an engine 320, and program data 314. In some embodiments, the engine 320 may be an application, a software program, a service, or a software platform, as described infra. The system memory 332 may also include a storage engine 316 that may store any information of data disclosed herein.

The operating system 330 may be a highly fault tolerant, scalable, and secure system such as: APPLE MACINTOSH OS X (Server); AT&T PLAN 9; BE OS; UNIX and UNIX-like system distributions (such as AT&T's UNIX; BERKLEY SOFTWARE DISTRIBUTION (BSD) variations such as FREEBSD, NETBSD, OPENBSD, and/or the like; Linux distributions such as RED HAT, UBUNTU, and/or the like); and/or the like operating systems. However, more limited and/or less secure operating systems also may be employed such as APPLE MACINTOSH OS, IBM OS/2, MICROSOFT DOS, MICROSOFT WINDOWS 2000/2003/3.1/95/98/CE/MILLENNIUM/NT/VISTA/XP (Server), PALM OS, and/or the like. The operating system 330 may be one specifically optimized to be run on a mobile computing device (e.g., one configuration for device 220 FIG. 1A), such as IOS, ANDROID, WINDOWS Phone, TIZEN, SYMBIAN, and/or the like.

As explained supra, the GUI of the device 220 may provide a baseline and means of accessing and displaying information graphically to users. The GUI may include APPLE MACINTOSH Operating System's AQUA, IBM's OS/2, Microsoft's WINDOWS 2000/2003/3.1/95/98/CE/MILLENNIUM/NT/XP/Vista/7 (i.e., AERO), UNIX'S X-Windows (e.g., which may include additional UNIX graphic interface libraries and layers such as K DESKTOP ENVIRONMENT (KDE), MYTHTV and GNU Network Object Model Environment (GNOME)), web interface libraries (e.g., ActiveX, AJAX, (D)HTML, FLASH, JAVA, JAVASCRIPT, etc. interface libraries such as, but not limited to, DOJO, JQUERY (UI), MOOTOOLS, PROTOTYPE, SCRIPT.ACULO.US, SWFOBJECT, or YAHOO! User Interface, any of which may be used.

Additionally, a web browser component (not shown) is a stored program component that is executed by the CPU. The web browser may be a conventional hypertext viewing application such as MICROSOFT INTERNET EXPLORER, EDGE, CHROME, FIREFOX, or NETSCAPE NAVIGATOR. SECURE WEB browsing may be supplied with 128 bit (or greater) encryption by way ofHTTPS, SSL, and/or the like. Web browsers allowing for the execution of program components through facilities such as ACTIVEX, AJAX, (D)HTML, FLASH, JAVA, JAVASCRIPT, web browser plug-in A Pis (e.g., FIREFOX, SAFARI Plug-in, and/or the like A Pis), and/or the like. Web browsers and like information access tools may be integrated into PDAs, cellular telephones, and/or other mobile devices.

A web browser may communicate to and/or with other components in a component collection, including itself, and/or facilities of the like. Most frequently, the web browser communicates with information servers, operating systems (such as the operating system 226), integrated program components (e.g., plug-ins), and/or the like; e.g., it may contain, communicate, generate, obtain, and/or provide program component, system, user, and/or data communications, requests, and/or responses. Of course, in place of a web browser and an information server, a combined application may be developed to perform similar functions of both. The combined application would similarly affect the obtaining and the provision of information to users, user agents, and/or the like from the enabled nodes of the present invention.

Moreover, the computing device 336 may have additional features or functionality, and additional interfaces to facilitate communications between the basic configuration and any desired devices and interfaces. For example, a bus/interface controller is used to facilitate communications between the basic configuration and data storage devices via a storage interface bus 302. The data storage devices may be one or more removable storage devices, one or more non-removable storage devices, or a combination thereof. Examples of the one or more removable storage devices and the one or more non-removable storage devices include magnetic disk devices (such as flexible disk drives and hard-disk drives (HDD)), optical disk drives (such as compact disk (CD) drives or digital versatile disk (DVD) drives), solid state drives (SSD), and tape drives, among others. Data stores 230, 232, and 234 are data storage devices shown in FIG. 1A.

In some embodiments, an interface bus facilitates communication from various interface devices (e.g., one or more output devices 338, one or more peripheral interfaces 346, and one or more communication devices 354) to the basic configuration via the bus/interface controller 310. Some of the one or more output devices 338 include a graphics processing unit 340 and an audio processing unit 344, which are configured to communicate to various external devices, such as a display or speakers, via one or more A/V ports 342.

The one or more peripheral interfaces 346 may include a serial interface controller 350 or a parallel interface controller 352, which are configured to communicate with external devices, such as input devices (e.g., a keyboard, a mouse, a pen, a voice input device, or a touch input device, etc.) or other peripheral devices (e.g., a printer or a scanner, etc.) via one or more 1/0 ports 348.

Further, the one or more communication devices 354 may include a network controller 356, which is arranged to facilitate communication with one or more other computing devices 360 over a network 210 communication link via one or more communication ports 358. The one or more other computing devices 360 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 332, the one or more removable storage devices 304, and the one or more non-removable storage devices 306 are examples of the computer-readable storage media. The computer-readable storage media is a tangible device that can retain and store instructions (e.g., program code) for use by an instruction execution device (e.g., the computing device 336). Any such, computer storage media is part of the computing device 336.

EXAMPLES

Clause 1. A method for targeted stock monitoring and trading comprising: establishing an unfiltered set of potential stocks of interest each having a unique stock identifier, said unfiltered set having at least a unique stock identifier, wherein the unfiltered set includes greater than one hundred unique stocks; filtering the unfiltered set via a primary filter to create a post-primary-filtered stock set having a primary quantity, wherein said primary filter generates a post primary-filtered stock set unique stocks with an average close-low percentage change greater than three (3) percent (%), wherein the primary quantity is at most five (5); and displaying the post primary-filtered stock set simultaneously for a given day; and simultaneously displaying and recurringly displaying one or more updates for each unique stock in the post primary-filtered stock set at least percentage change from low and a percentage change from high for each of the unique stocks in the post-primary-filtered stock set.

Clause 2. The method of clause 1, the filtering further comprising: filtering an unfiltered subset via a first sub-filter to generate a post-first-filter subset, wherein said first sub-filter filters out all unique stocks with a moving average trading volume less than or equal to a first sub-filter threshold of shares; filtering the post-first-filter subset via a second sub-set filter to generate a post-second-filter subset, wherein the second sub-set filter is a performance filter; and filtering the post-second-filter subset via a third sub-set filter to generate a post-third-filter subset, wherein the third sub-set filter performs rank filtering.

Clause 3. The method of clause 2, wherein the first sub-filter threshold is eight hundred thousand.

Clause 4. The method of clause 2, wherein if the post-first-filter subset is not greater than the primary quantity, the second sub-set filter and the third sub-set filter is not applied, and the post-primary-filtered stock set is the post-first-filter subset.

Clause 5. The method of clause 2, wherein if the post-second-filter subset is not greater than the primary quantity, the third sub-set filter is not applied, and the post-primary-filtered stock set is the post-second-filter subset.

Clause 6. The method of clause 2, wherein the post-third-filter subset includes a number of unique stocks equal to the primary quantity, wherein the post-primary-filtered stock set is the post-third-filter subset.

Clause 7. The method of clause 2, wherein the post-second-filter subset contains unique stocks with a close-low percentage change percentage, which is on average greater than the close-low percentage change percentage than that of the unfiltered subset and of that of the post-first-filter subset.

Clause 8. The method of clause 7, wherein the post-third-filter subset contains unique stocks with an average close-low percentage change percentage, which is on average greater than the close-low percentage change percentage than that of the post-second-filter subset.

Clause 9. The method of clause 1, wherein on average based on a running 30-day average, stocks in the post-primary-filtered stock set exhibit a statistically significant increase in a number of days where a daily adverse change percentage of included unique stocks is greater than three (3) percent when compared to the unique stocks in the unfiltered set, wherein the statistically significant increase is at least fifteen percent.

Clause 10. The method of clause 1, wherein the unfiltered set of potential stocks includes only unique stocks published in a most current INVESTOR'S BUSINESS DAILY (IBD) list that is a daily list available online.

Clause 11. The method of clause 10, wherein the unfiltered set is a mathematical intersection of unique stocks of a list and a most current ASSOCIATION OF CHARTERED CERTIFIED ACCOUNTANTS (ACCA) list that is a daily list available online.

Clause 12. The method of clause 1, wherein online information is repetitively gathered from POLY GON.1O throughout a trading day to generate information utilized for the updates that are simultaneously displayed for each unique stock in the post-primary-filtered stock set.

Clause 13. The method of clause 1, wherein online information is repetitively gathered from real-time quotes of YAHOO.COM throughout a trading day to generate information utilized for the updates that are simultaneously displayed for each unique stock in the post-primary-filtered stock set.

Clause 14. The method of clause 2, wherein online information from EODDATA.COM is utilized by the primary filter, the first sub-filter, the second sub-filter, and the third sub-filter.

Clause 15. The method of clause 2, wherein the second sub-filter is a multi-stage filter that: in a first stage utilizes one of an AccPos and A ccNeg list; in a second stage utilizes one of a RsPos and RsNeg list; and in a third stage utilizes one of a CompPos and CompNeg list, wherein each of the first, second, and third stages filters out more unique stocks.

Clause 16. The method of clause 15, wherein in the first stage, the one of the AccPos and RsNeg list that provides a greater number of unique stocks when so filtered is used for filtering in the second stage.

Clause 17. The method of clause 15, wherein in the second stage, the one of the CompPos and CompNeg list that provides a greater number of unique stocks when so filtered is used for filtering in the first stage.

Clause 18. The method of clause 2, wherein a quantity of unique stocks in the post-second-filter subset is greater than the primary quantity, wherein the third sub-set filter ranks each of the unique stocks in the post-second-filter subset and selects the primary quantity of unique stocks having a highest ranking.

Clause 19. A method for targeted stock monitoring and trading comprising: establishing an unfiltered set of potential stocks of interest each having a unique stock identifier, said unfiltered set having at least a unique stock identifier, and stock specific information to determine a fifty-day moving average of shares traded daily, wherein the unfiltered set contains greater than one hundred unique stocks; filtering the unfiltered set via a primary filter to create a post-primary-filtered stock set having a primary quantity, wherein said primary filter is configured to substantially ensure that the post-primary-filtered stock set contains unique stocks with a close-low percentage change greater than three (3) percent (%), wherein the primary quantity is at most five (5), wherein the filtering further comprises: filtering an unfiltered subset via a first sub-filter to generate a post-first-filter subset, wherein said first sub-filter filters out the unique stocks with a moving average trading volume less than or equal to a first sub-filter threshold of shares; filtering the post-first-filter subset via a second sub-set filter to generate a post-second-filter subset, wherein the second sub-set filter is a performance filter; and filtering the post-second-filter subset via a third sub-set filter to generate a post-third-filter subset, wherein the third sub-set filter performs rank filtering, wherein the post-primary-filtered stock list is the post-third-filter subset; and displaying the post-primary-filtered filtered stock set simultaneously for a given day; and simultaneously displaying one or more updates and recurringly displaying the one or more updates for each unique stock in the post-primary-filtered stock set at least percentage change from low and a percentage change from high for each of the unique stocks in the post-primary-filtered set.

Clause 20. A method for targeted stock monitoring and trading comprising: establishing an unfiltered set of potential stocks of interest each having a unique stock identifier, said unfiltered set having at least a unique stock identifier, and stock specific information to determine a fifty-day moving average of shares traded daily, wherein the unfiltered set contains greater than one hundred unique stocks, wherein the unfiltered set is derived from one or more online daily lists of stocks including at least one of an INVESTOR's BUSINESS DAILY list and an ASSOCIATION OF CHARTERED CERTIFIED ACCOUNTANTS (ACCA) list, wherein the unfiltered set is dynamic in that it changes daily;

filtering the unfiltered set via a primary filter to create a post-primary-filtered stock set having a primary quantity, wherein said primary filter is configured to substantially ensure that the post-primary-filtered stock set contains unique stocks with a close-low percentage change greater than three percent, wherein the primary quantity is at most five, wherein online information based on a publicly available end of day data is utilized by the primary filter, wherein the post-primary-filtered stock set is dynamic in that it changes daily; and displaying the post-primary-filtered filtered stock set simultaneously for a given day, wherein the displaying simultaneously displays and recurringly updates for each unique stock in the post-primary-filtered stock set at least percentage change from low and a percentage change from high for each of the unique stocks in the post-primary-filtered, wherein online information base on publicly available updates is used for the recurrent updates for each unique stock being simultaneously displayed.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 334 of a general purpose computer, special purpose computer, or other programmable data processing apparatus (e.g., the computing device 336) to produce a machine, such that the instructions, which execute via the processor 334 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 336), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

In certain embodiments, the apparatus and methods delineated above find application within a system comprising one or more integrated circuit (IC) devices, also referred to as integrated circuit packages or microchips, akin to the previously described processing system. Electronic design automation (EDA) and computer-aided design (CAD) software tools facilitate the design and fabrication of these IC devices. Typically, these design tools manifest as one or more software programs, comprising executable code designed to manipulate a computer system. Such manipulation involves the processing of code representative of circuitry within one or more IC devices, thereby executing at least a portion of a process aimed at designing or adapting a manufacturing system for fabricating said circuitry. This code encompasses instructions, data, or a combination thereof, and is stored in a computer-readable storage medium accessible to the computing system. The code representative of various design or fabrication phases may be stored and accessed from the same or different computer-readable storage media.

A computer-readable storage medium encompasses any non-transitory medium or combination thereof accessible by a computer system during operation to furnish instructions and/or data. These media include optical media (e.g., CDs, DVDs, Blu-Ray discs), magnetic media (e.g., floppy discs, magnetic tape, magnetic hard drives), volatile memory (e.g., RAM, cache), non-volatile memory (e.g., ROM, Flash memory), or microelectromechanical systems (MEMS)-based storage media. Such media may be embedded, fixedly attached, or removably attached to the computing system, or coupled to it via a wired or wireless network.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for targeted stock monitoring and trading comprising one or more processors, of a computing device, executing steps of:
    establishing an unfiltered set of one or more stocks of interest each having a unique stock identifier, said unfiltered set having at least a unique stock identifier, wherein the unfiltered set includes greater than one hundred unique stocks;
    dynamically filtering, by the one or more processors, the unfiltered set via a primary filter;

creating, by the one or more processors, a post-primary-filtered stock set having a primary quantity, and dynamically generating, by the one or more processors, a post primary-filtered stock set unique stocks with an average close-low percentage change greater than three (3) percent (%), wherein the primary quantity is at most five (5);
wherein the filtering comprises:
filtering, by the one or more processors, an unfiltered subset via a first sub-filter;
generating, by the one or more processors, a post-first-filter subset, wherein said first sub-filter filters out all unique stocks with a moving average trading volume less than or equal to a first sub-filter threshold of shares;
filtering, by the one or more processors, the post-first-filter subset via a second sub-set filter;
generating, by the one or more processors, a post-second-filter subset, wherein the second sub-set filter is a performance filter;
filtering, by the one or more processors, the post-second-filter subset via a third sub-set filter;
generating, by the one or more processors, a post-third-filter subset, wherein the third sub-set filter performs rank filtering; and
displaying the post primary-filtered stock set simultaneously for a given day in an
integrated stock monitoring and filtering interface of the computing device; and
simultaneously displaying and recurringly displaying one or more dynamic updates in the integrated stock monitoring and filtering interface of the computing device for each unique stock in the post primary-filtered stock set at least percentage change from low and a percentage change from high for each of the unique stocks in the post-primary-filtered stock set in real-time; and
visualizing, tracking and refining a list of stocks dynamically on the computing device for trading based on combination of real-time performance and predefined screening parameters.

2. The method of claim 1, wherein the first sub-filter threshold is eight hundred thousand.

3. The method of claim 1, wherein if the post-first-filter subset is not greater than the primary quantity, the second sub-set filter and the third sub-set filter is not applied, and the post-primary-filtered stock set is the post-first-filter subset.

4. The method of claim 1, wherein if the post-second-filter subset is not greater than the primary quantity, the third sub-set filter is not applied, and the post-primary-filtered stock set is the post-second-filter subset.

5. The method of claim 1, wherein the post-third-filter subset includes a number of unique stocks equal to the primary quantity, wherein the post-primary-filtered stock set is the post-third-filter subset.

6. The method of claim 1, wherein the post-second-filter subset contains unique stocks with a close-low percentage change percentage, which is on average greater than the close-low percentage change percentage than that of the unfiltered subset and of that of the post-first-filter subset.

7. The method of claim 6, wherein the post-third-filter subset contains unique stocks with an average close-low percentage change percentage, which is on average greater than the close-low percentage change percentage than that of the post-second-filter subset.

8. The method of claim 1, wherein on average based on a running 30-day average, stocks in the post-primary-filtered stock set exhibit a statistically significant increase in a number of days where a daily adverse change percentage of included unique stocks is greater than three (3) percent when compared to the unique stocks in the unfiltered set.

9. The method of claim 1, wherein the unfiltered set of one or more stocks includes only unique stocks published in a list.

10. The method of claim 9, wherein the unfiltered set is a mathematical intersection of unique stocks of a list and a most current ASSOCIATION OF CHARTERED CERTIFIED ACCOUNTANTS (ACCA) list that is a daily list available online.

11. The method of claim 1, wherein online information is repetitively gathered from POLYGON.10 throughout a trading day; and
the one or more processors executing steps of generating information utilized for the updates that are simultaneously displayed for each unique stock in the post-primary-filtered stock set.

12. The method of claim 1, wherein online information is repetitively gathered from real-time quotes of YAHOO.COM throughout a trading day; and
the one or more processors executing steps of generating information utilized for the updates that are simultaneously displayed for each unique stock in the post-primary-filtered stock set.

13. The method of claim 1, wherein online information from EODDATA.COM is utilized by the primary filter, the first sub-filter, the second sub-filter, and the third sub-filter.

14. The method of claim 1, wherein the second sub-filter is a multi-stage filter that: in a first stage utilizes one of an AccPos and AccNeg list; in a second stage utilizes one of a RsPos and RsNeg list; and in a third stage utilizes one of a CompPos and CompNeg list, wherein each of the first, second, and third stages filters out more unique stocks.

15. The method of claim 14, wherein in the first stage, the one of the RsPos and RsNeg list that provides a greater number of unique stocks when so filtered is used for filtering in the second stage.

16. The method of claim 14, wherein in the second stage, the one of the CompPos and CompNeg list that provides a greater number of unique stocks when so filtered is used for filtering in the first stage.

17. The method of claim 1, wherein a quantity of unique stocks in the post-second-filter subset is greater than the primary quantity, wherein the third sub-set filter ranks each of the unique stocks in the post-second-filter subset and selects the primary quantity of unique stocks having a highest ranking.

18. A method for targeted stock monitoring and trading comprising one or more processors, of a computing device, executing steps of:
establishing an unfiltered set of potential stocks of interest each having a unique stock identifier, said unfiltered set having at least a unique stock identifier, and stock specific information to determine a fifty-day moving average of shares traded daily, wherein the unfiltered set contains greater than one hundred unique stocks;
dynamically filtering, by the one or more processors, the unfiltered set via a primary filter;
creating, by the one or more processors, a post-primary-filtered stock set having a primary quantity, and dynamically generating, by the one or more processors, the post-primary-filtered stock set containing unique stocks with a close-low percentage change greater than three (3) percent (%), wherein the primary quantity is at most five (5), wherein the filtering further comprises:

filtering, by the one or more processors, an unfiltered subset via a first sub-filter;
generating, by the one or more processors, a post-first-filter subset, wherein said first sub-filter filters out the unique stocks with a moving average trading volume less than or equal to a first sub-filter threshold of shares;
filtering, by the one or more processors, the post-first-filter subset via a second sub-set filter;
generating, by the one or more processors, a post-second-filter subset, wherein the second sub-set filter is a performance filter; and
filtering, by the one or more processors, the post-second-filter subset via a third sub-set filter;
generating, by the one or more processors, a post-third-filter subset, wherein the third sub-set filter performs rank filtering, wherein the post-primary-filtered stock list is the post-third-filter subset; and
displaying the post-primary-filtered filtered stock set simultaneously for a given day in an integrated stock monitoring and filtering interface of the computing device; and
simultaneously displaying one or more updates and recurringly displaying the one or more dynamic updates in the integrated stock monitoring and filtering interface of the computing device for each unique stock in the post-primary-filtered stock set at least percentage change from low and a percentage change from high for each of the unique stocks in the post-primary-filtered set in real-time; and
visualizing, tracking and refining list of stocks dynamically for trading based on combination of real-time performance and predefined screening parameters.

19. A method for targeted stock monitoring and trading comprising one or more processors, of a computing device, executing steps of:
establishing an unfiltered set of one or more stocks of interest each having a unique stock identifier, said unfiltered set having at least a unique stock identifier, and stock specific information to determine a fifty-day moving average of shares traded daily, wherein the unfiltered set contains greater than one hundred unique stocks,
wherein the unfiltered set is derived from one or more lists of stocks,
wherein the unfiltered set is dynamic in that it changes daily;
dynamically filtering, by the one or more processors, the unfiltered set via a primary filter;
creating, by the one or more processors, a post-primary-filtered stock set having a primary quantity,
dynamically generating, by the one or more processors, the post-primary-filtered stock set containing unique stocks with a close-low percentage change greater than three percent, wherein the primary quantity is at most five,
wherein the filtering comprises:
filtering, by the one or more processors, an unfiltered subset via a first sub-filter;
generating, by the one or more processors, a post-first-filter subset, wherein said first sub-filter filters out all unique stocks with a moving average trading volume less than or equal to a first sub-filter threshold of shares;
filtering, by the one or more processors, the post-first-filter subset via a second sub-set filter;
generating, by the one or more processors, a post-second-filter subset, wherein the second sub-set filter is a performance filter;
filtering, by the one or more processors, the post-second-filter subset via a third sub-set filter;
generating, by the one or more processors, a post-third-filter subset, wherein the third sub-set filter performs rank filtering;
wherein online information based on a publicly available end of day data is utilized by the primary filter, wherein the post-primary-filtered stock set is dynamic in that it changes daily;
displaying the post-primary-filtered filtered stock set simultaneously for a given day in an integrated stock monitoring and filtering interface of the computing device, wherein the displaying simultaneously displays and recurringly updates for each unique stock in the post-primary-filtered stock set at least percentage change from low and a percentage change from high for each of the unique stocks in the post-primary-filtered, wherein online information base on publicly available updates is used for the recurrent updates for each unique stock being simultaneously displayed in real-time; and
visualizing, tracking and refining a list of stocks dynamically on the computing device for trading based on combination of real-time performance and predefined screening parameters.

* * * * *